(12) United States Patent
Koshelev et al.

(10) Patent No.: US 11,448,815 B2
(45) Date of Patent: Sep. 20, 2022

(54) SLAB WAVEGUIDE AND PROJECTOR WITH INTERMODAL COUPLING

(71) Applicant: Facebook Technologies, LLC, Menlo Park, CA (US)

(72) Inventors: Alexander Koshelev, Redmond, WA (US); Giuseppe Calafiore, Redmond, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 151 days.

(21) Appl. No.: 17/091,812

(22) Filed: Nov. 6, 2020

(65) Prior Publication Data
US 2022/0146740 A1 May 12, 2022

(51) Int. Cl.
*F21V 8/00* (2006.01)
*G02B 6/12* (2006.01)
*G02B 6/293* (2006.01)
*G02B 27/01* (2006.01)
*G02B 6/14* (2006.01)
*G02B 6/28* (2006.01)

(52) U.S. Cl.
CPC ......... *G02B 6/0055* (2013.01); *G02B 6/0076* (2013.01); *G02B 6/12002* (2013.01); *G02B 6/12004* (2013.01); *G02B 6/12014* (2013.01); *G02B 6/29331* (2013.01); *G02B 6/29332* (2013.01); *G02B 27/0172* (2013.01); *G02B 2027/0178* (2013.01)

(58) Field of Classification Search
CPC ............... G02B 6/0055; G02B 6/0076; G02B 6/12002; G02B 6/12004; G02B 6/12014; G02B 6/29331; G02B 6/29332; G02B 6/14; G02B 6/2821; G02B 27/0172; G02B 27/0093; G02B 2027/0178
See application file for complete search history.

(56) References Cited

U.S. PATENT DOCUMENTS

| | | | | |
|---|---|---|---|---|
| 9,933,587 B2 * | 4/2018 | Modavis | ............. | H01L 51/5268 |
| 10,810,917 B2 * | 10/2020 | Fattal | ..................... | G02B 30/33 |
| 2007/0086703 A1 * | 4/2007 | Kirk | .................... | G02B 6/12007 |
| | | | | 385/24 |
| 2017/0285348 A1 * | 10/2017 | Ayres | ................... | G02B 6/0055 |
| 2018/0120563 A1 * | 5/2018 | Kollin | ................. | G03H 1/2249 |
| 2020/0292819 A1 * | 9/2020 | Danziger | .......... | G02B 27/0172 |

OTHER PUBLICATIONS

International Search Report and Written Opinion for International Application No. PCT/US2021/057835, dated Feb. 22, 2022, 11 pages.

* cited by examiner

*Primary Examiner* — Ryan A Lepisto
*Assistant Examiner* — Erin D Chiem
(74) *Attorney, Agent, or Firm* — Pequignot + Myers; Matthew A. Pequignot

(57) ABSTRACT

A compact collimator or projector includes a waveguide having a slab core structure supporting at least two lateral modes of propagation. A light beam coupled into a first mode propagates to an edge of the waveguide where it is reflected by a reflector to propagate back. Upon propagation back and forth, the light is converted into a second mode. An out-coupling region, such as an evanescent coupler, is provided to out-couple the light propagating in the second mode. The reflector may have focusing power to collimate the out-coupled light beam. The light beam may be converted from the first to the second mode without being reflected from a reflector.

20 Claims, 19 Drawing Sheets

SLAB WAVEGUIDE AND PROJECTOR WITH INTERMODAL COUPLING

TECHNICAL FIELD

The present disclosure relates to waveguide-based optical devices, and in particular to collimators and projectors usable for displaying images, remote sensing, etc.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Head mounted displays (HMD), near-eye displays (NED), and the like are being used increasingly for displaying content to individual users. The content displayed by HMD/NED includes virtual reality (VR) content, augmented reality (AR) content, mixed reality (MR) content, etc. The displayed VR/AR/MR content can be three-dimensional (3D) to enhance the experience and, for AR/MR applications, to match virtual objects to real objects observed by the user concurrently with real objects.

Compact display devices are desired for head-mounted displays. Because a display unit of NED is usually worn on the head of a user, a large, bulky, unbalanced, and/or heavy display device would be cumbersome and may be uncomfortable for the user to wear. Compact display devices require compact light sources and image projectors.

BRIEF DESCRIPTION OF THE DRAWINGS

Exemplary embodiments will now be described in conjunction with the drawings, in which.

DETAILED DESCRIPTION

Figure 1A:
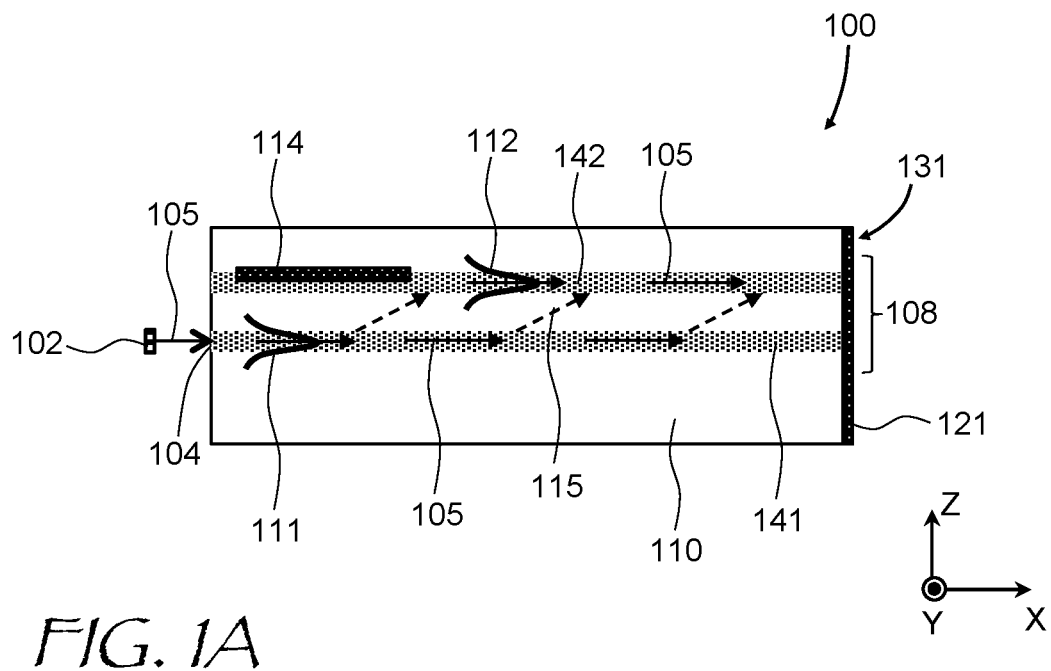
FIGS. 1A and 1B are side cross-sectional views of a waveguide having a single reflector, the views showing forward and backward propagation, respectively, of a light beam in a slab core structure, wherein the slab core structure includes a pair of evanescently coupled cores.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Many types of displays, especially worn display systems, require a compact source of collimated light. An arrayed source, i.e. a source including an array of emitters, each emitter providing a collimated beam with a beam angle depending on the emitter's position in the array, may be used in compact projector systems of a near-eye display. Combining a collimator with an array of point sources such as Mach-Zehnder interferometer (MZI) array, digital micromirror device (DMD), a liquid crystal (LC) array enables one to construct a one-dimensional (1D) projector for use e.g. in sensing applications. Furthermore, combination of such 1D projector with a scanning element, such as microelectromechanical system (MEMS) mirror or a dispersive element in combination with tunable wavelength light source, enables one to construct a 2D projector for visual display applications.

1D collimator can be made much more compact than its 2D counterpart, even when using conventional free space cylindrical optics. For instance, a 10×10×10 mm collimator would be too bulky to put in most mobile devices, while a 10×10×1 mm device, depending on orientation, does not pose a significant problem for integration into a mobile phone or another compact mobile device. Therefore, 1D collimator that fits inside a mobile device, has much fewer constraints on the attainable field of view (FOV), eyebox size, effective focal length (EFL), pitch of point sources, than its 2D counterpart.

In accordance with this disclosure, a single-mode or few-mode slab (planar) waveguide may be used to create the 1D collimator. Since the light is confined into the single layer ~0.2-2 μm thick, such a collimator can be very thin and have low volume and mass, especially when bonded to other flat functional components for mechanical support. Because of the light confinement in the direction of waveguide thickness, the light beam does not spread (diffract) out of plane, which is the physical effect that leads to an increase of the thickness of a free space cylindrical collimator. Additionally, gradual out-coupling of light from a slab waveguide using, for example, a grating or prism, enables the formation of a large area pupil while still preserving a thin form factor. By way of an example, a slab waveguide can create a 2×2 mm pupil while still be <2 mm thick. Finally, a slab waveguide, as other kinds of integrated optics, offers the advantage that even a complicated free form optics can be easily fabricated using photolithography.

A slab waveguide may include a variety of elements having optical (i.e. focusing or defocusing) power in plane of the waveguide. These optical elements may be refractive, reflective, or diffractive. Refractive optical elements may be formed by partially etching the core layer. This changes the effective refractive index of the guided optical mode, which causes refraction, while the light is still confined within the waveguide. Transition between etched and non-etched region needs to be gradual to avoid light loss out of plane. This can be accomplished e.g. by using greytone etching and/or by using subwavelength binary structures. Reflective optical elements may be formed by using deep etch, with subsequent metallization of walls. This approach also enables path folding, reducing the longest dimension of the element. Diffractive optical elements may work both in reflection and transmission and may be formed by etching, as well.

From the optical aberrations standpoint, it may be preferable that the optical elements, including reflectors, are on-axis. It is straightforward to construct a mirror that works for a reasonably large FOV, as long as the mirror's axis is inline with the optical axis. The inline, on-axis mirror configuration offers optimal optical performance. In addition to achieving good optical performance, such architecture also reduces the size of the optics, especially if more than one reflector is employed. However, for an on-axis reflective configuration to work, the waveguide needs to be configured to de-couple reflected light from the incoming light.

In accordance with the present disclosure, a slab waveguide may be configured to shift the light energy between different lateral modes of propagation upon reflection from the reflector(s). This may be achieved in a few ways, including providing coupled multiple cores, a few-mode or multimode slab waveguide core with intermode couplers, etc. The mode shift may be achieved via evanescent coupling, multimode interference, reflective, diffractive, etc. mode out-couplers, and so on.

In accordance with the present disclosure, there is provided a waveguide comprising a slab core structure supporting first and second optical modes of propagation, an input port for receiving a light beam for propagation in the first optical mode, a first reflector coupled to the slab core structure for reflecting the light beam to propagate back in the slab core structure, and an out-coupling region for out-coupling the light beam reflected by the first reflector. The waveguide is configured for conversion of the light beam from the first optical mode to the second optical mode upon propagation in the slab core structure and upon reflection from the first reflector, whereby at least a portion of the light beam is out-coupled from the waveguide at the out-coupling region. The out-coupling region may be configured for out-coupling light propagating in the second optical mode. The first reflector may have optical power for at least partial collimation of the light beam received at the input port. The collimation is in a plane of the slab core structure. The out-coupling region may include an evanescent out-coupler.

In some embodiments, the slab core structure includes parallel evanescently coupled first and second slab cores offset from one another in a direction of thickness of the waveguide by a distance at which a major portion of the light beam is converted from the first optical mode propagating in the first slab core to the second optical mode propagating in the second slab core when the light beam reflected from the first reflector reaches the out-coupling region.

In some embodiments where the slab core structure comprises parallel evanescently coupled first and second slab cores, the first slab core is a singlemode slab core, and the second slab core includes sequentially coupled first and second slab portions having different effective refractive indices. The first portion is coupled to the first reflector, and the second slab portion is coupled to the out-coupling region. The first and second slab cores may be offset from one another in a direction of thickness of the waveguide by a distance at which a major portion of the light beam is converted from the first optical mode propagating in the first slab core to the second optical mode propagating in the first portion of the second slab core when the light beam reflected from the first reflector reaches the second portion of the second slab core.

In some embodiments where the slab core structure includes parallel first and second slab cores, the first reflector includes optically coupled first and second slanted reflectors; the first slanted reflector is coupled to the first slab core for reflecting the light beam propagating in the first slab core to the second slanted reflector; and the second slanted reflector is coupled to the second slab core for coupling the light beam reflected by the second slanted reflector into the second slab core. In some embodiments, the first slab core comprises a first diffractive reflector proximate the first reflector, and the second slab core comprises a second diffractive reflector proximate the first reflector disposed over and optically coupled to the first diffractive reflector.

In some embodiments, the slab core structure comprises a few-mode waveguide, where the first mode is a zero-order mode of the few-mode waveguide, and the second mode is a higher-order mode of the few-mode waveguide. The first reflector may include a step for providing a half-wave phase shift for a portion of light reflecting from the first reflector, whereby at least a portion of the light beam is converted from the zero-order mode to the higher-order mode upon reflection from the first reflector. The first reflector may include a diffractive reflector coupled to, or formed in the few-mode waveguide, and configured to convert at least a portion of the light beam from the zero-order mode to the higher-order mode upon reflection from the diffractive reflector. The diffractive reflector may have a pitch $P=\lambda/(n^0_{eff}+n^1_{eff})$, where $\lambda$ is a wavelength of the light beam, $n^0_{eff}$ is an effective refractive index for the zero-order mode, and $n^1_{eff}$ is an effective refractive index for the higher order mode.

In some embodiments of this disclosure, the slab core structure further supports a third optical mode of propagation, the waveguide further comprising a second reflector coupled to the slab core structure for reflecting the light beam reflected by the first reflector to propagate back towards the first reflector. The out-coupling region may be configured for out-coupling light propagating in the third optical mode. The waveguide may be configured for conversion of the light beam from the second optical mode to the third optical mode upon reflection from the second reflector and propagating in the slab waveguide structure, whereby at least a portion of the light beam is out-coupled from the waveguide at the out-coupling region. The first and second reflectors may be coaxial curved reflectors having optical power for collimating the light beam received at the input port. The slab core structure may include parallel evanescently coupled first, second, and third slab cores offset from one another in a direction of thickness of the waveguide by a distance at which a major portion of the light beam is converted from the first optical mode propagating in the first slab core to the second optical mode propagating in the second slab core when the light beam reflected from the first reflector reaches the second reflector; and from the second optical mode propagating in the second slab core to the third optical mode propagating in the third slab core when the light beam reflected from the second reflector reaches the out-coupling region. Also in embodiments where the slab core structure includes a few-mode waveguide, the first reflector may include a first diffractive reflector coupled to, or formed in the few-mode waveguide, and configured to convert at least a portion of the light beam from the zero-order mode to the second mode upon reflection from the first diffractive reflector; and the second reflector may include a second diffractive reflector coupled to, or formed in the few-mode waveguide, and configured to convert at least a portion of the light beam from the second mode to the third mode upon reflection from the second diffractive reflector.

In accordance with the present disclosure, there is provided a waveguide including a slab core structure supporting first and second optical modes of propagation, the slab core structure comprising an intermodal coupler for conversion of the light beam from the first optical mode to the second optical mode upon propagation in the intermodal coupler, an input port upstream of the intermodal coupler for receiving a light beam for propagation in the slab core structure in the first optical mode, and an out-coupling region downstream of the intermodal coupler for out-coupling light propagating in the second optical mode. The intermodal coupler may include e.g. at least one of: optical power for collimation or defocusing the light beam; or an aberration correction capability. In some embodiments, the first and second optical modes have different effective refractive indices, and the intermodal coupler includes a grating shaped in a plane of the slab core structure for different rays of the light beam in the plane of the slab core structure to have different optical path length from the input port to the grating.

In accordance with the present disclosure, there is further provided a projector comprising an array of light sources for providing light beams and any of the waveguides disclosed herein.

Figure 1B:
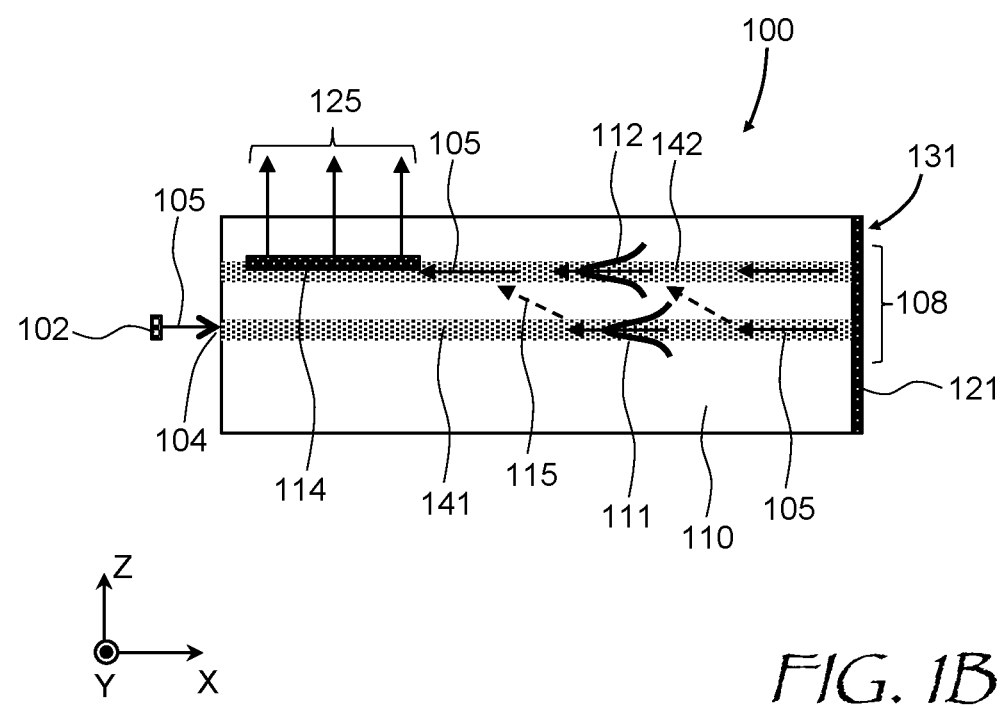

Referring now to FIGS. 1A and 1B, a waveguide 100 includes a slab core structure 108, which may be supported by a substrate 110. A reflector 121 is coupled to the slab core structure 108. The reflector 121 is disposed at an edge 131 of the waveguide 10 in this example. An out-coupling region 114 is provided over the slab core structure 108 for out-coupling of light propagated in the waveguide 100. An array of light sources 102 may be coupled to an input port 104 of the waveguide 100. The array of light sources 102 coupled the waveguide 100 may be used as a 1D projector that scans a light beam or provides a line of an image in angular domain. The array of light sources 102 may include an emitter array such as a superluminescent LED (SLED) array or a laser diode (LD) array, or an array of point sources of light such as micromirrors optically coupled to a single emitter or light source, an array of Mach-Zehnder interferometers (MZIs) coupled to a single emitter or light source, etc.

The slab core structure 108 includes parallel evanescently coupled first 141 and second 142 slab cores, e.g. singlemode or few-mode cores, offset from one another in a direction of thickness of the waveguide 100, i.e. along Z-axis in FIGS. 1A and 1B. The slab core structure 108 supports first 111 and second 112 optical modes of propagation of in-coupled light in the first 141 and second 142 cores respectively. In operation, the array of light sources 102 emits at least one light beam 105 (FIG. 1A), which is coupled at the input port 104 into the first optical mode 111. The light beam 105 propagates towards the edge 131 of the waveguide 100. The reflector 121 reflects the light beam 105 to propagate back in the slab core structure 108 (FIG. 1B). The waveguide 100 is configured to convert the light beam 105 from the first optical mode 111 to the second optical mode 112 upon propagation in the slab core structure 108 towards the reflector 121 and back, after reflection from the reflector 121. The intermodal transitions are denoted with dashed arrows 115. To provide the required coupling of the light energy from the first optical mode 111 to the second optical mode 112, the first 141 and second 142 slab cores may be offset from one another by a distance (separation) at which a major portion, e.g. at least 50%, 60%, 70%, 80%, 90%, or more, of the light beam 105 is converted from the first optical mode 111 propagating in the first slab core 141 to the second optical mode 112 propagating in the second slab core 142 when the light beam 105 reflected from the reflector 121 reaches the out-coupling region 114. It is noted that the conversion of the light beam 105 from the first optical mode 111 to the second optical mode 112 occurs along the entire optical path of propagation of the light beam 105 from the input port 104 to the reflector 121 (i.e. in the positive direction of X-axis) and back to the out-coupling region 114 (i.e. in the negative direction of X-axis).

The function of the out-coupling region 114 is to outcouple at least a portion 125 of the light beam 105 propagating in the second optical mode 112 in this example (i.e. in the second slab core 142) from the waveguide 100. The out-coupling region 114 may include, for example, an out-coupler coupled to the second slab core 142. The out-coupler may include an optical element such as a prism, a transparent plate, a prismatic mirror, a diffraction grating, etc. The reflector 121 may have optical power, i.e. focusing power in this case, for at least partial collimation of the light beam 105 received at the input port 104 in a plane of the slab core structure, i.e. in XY plane in FIGS. 1A and 1B. The above description of the out-coupling region 114, the reflector 121, and the overall operation of the waveguide 100 also applies to all waveguide variants considered in this disclosure.

When light sources of the array of light sources 102 are energized, each light source provides a light beam that is collimated by the reflector 121 to propagate at an angle specific to that particular light source. Together, the collimated light beams form a beam fan originating at the out-coupling region 114, each light beam of the fan being individually adjustable in brightness. This may be used in a variety of applications, including image projection, remote sensing, direct beam scanning, illumination system MEMS-based scanners, 3D imaging, etc. For imaging applications, the generated fan of light beams corresponds to a line of an image in angular domain. It is further noted that all projectors and waveguides described in this disclosure are intended to be non-limiting illustrations of waveguide structures. Numerous other applications are possible, e.g. color filtering, dispersion engineering, beam collimation, aberration correction, and so on, for applications ranging from pico-projectors and flat collimators to backlight units for displays, direct mixed reality (MR) displays, sensors, scanners, etc.

Figure 2A:
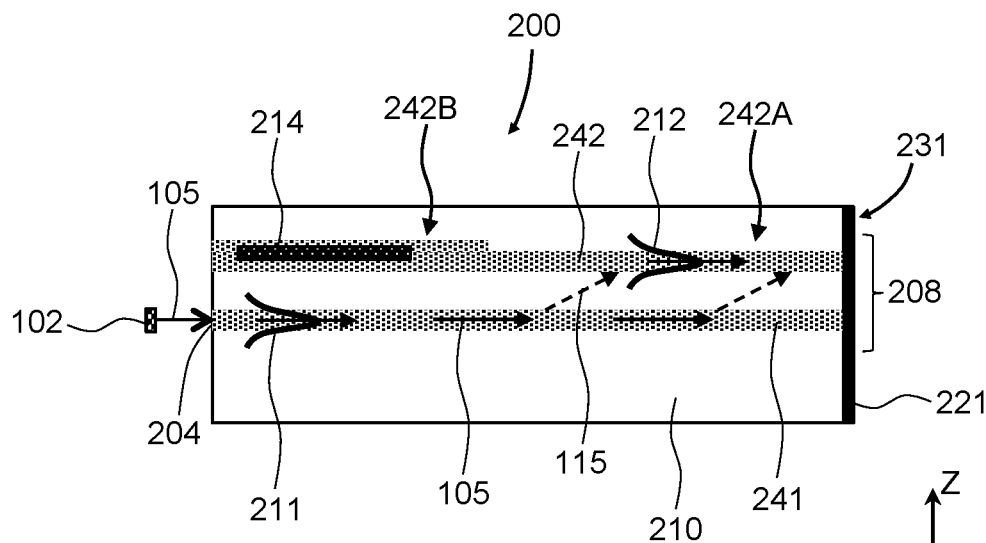
FIGS. 2A and 2B are side cross-sectional views of a waveguide illustrating forward and backward propagation, respectively, of a light beam in a slab core structure including a pair of evanescently coupled cores where one of the cores has a multimode core portion.
Figure 2B:
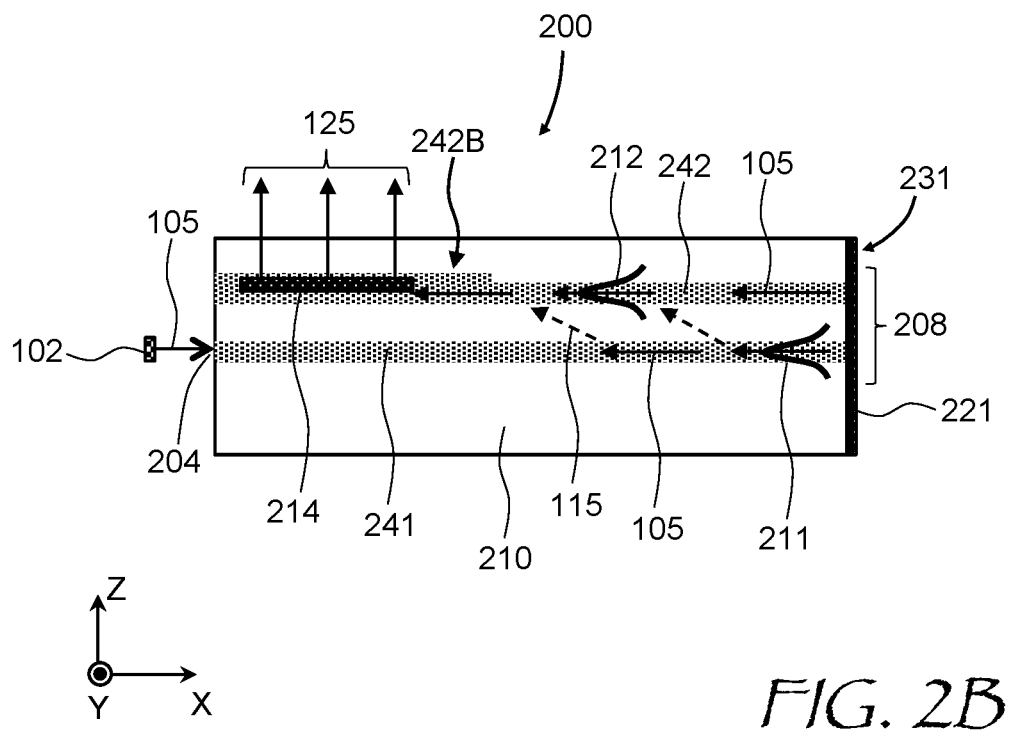

Turning to FIGS. 2A and 2B, a waveguide 200 is similar to the waveguide 100 of FIGS. 1A and 1B, and includes similar elements, e.g. a slab core structure 208 supported by a substrate 210, a reflector 221 coupled to the slab core structure 208 at an edge 231 of the waveguide 200, and an out-coupling region 214 over the slab core structure 208.

The slab core structure 208 includes parallel evanescently coupled first 241 and second 242 slab cores supporting first 211 and second 212 optical modes of propagation respectively. The first slab core 241 is a singlemode slab core, and the second slab core 242 includes coupled first 242A and second 242B slab core portions of different thicknesses. The thickness of the first slab core portion 242A is such that the effective refractive index of the optical mode propagating in the first slab core portion 242A matches that of the optical mode propagating in the first slab core 241, enabling coupling between the two waveguides. The thickness of the second slab core portion 242B is different—either higher or lower—preventing the efficient light exchange with the first slab core 241 due to the effective refractive index mismatch.

The first slab core portion 242A is coupled to the reflector 221, and the second slab portion 242B is coupled to the out-coupling region 214. To provide the coupling of the light energy from the first optical mode 211 to the second optical mode 212, the first 241 and second 242 slab cores are offset from one another in a direction of thickness of the waveguide 200, i.e. in Z-direction in FIGS. 2A and 2B, by a distance at which a major portion, e.g. at least 50%, 60%, 70%, 80%, 90%, or more, of the light beam 105 is converted from the first optical mode 211 propagating in the first slab core 241 to the second optical mode 212 propagating in the first portion 242A of the second slab core 242 by the time when the light beam 105 reflected from the reflector 221 reaches the second portion 242B of the second slab core 242. The mode conversion occurs mostly between the slab waveguide 241 and the first slab waveguide portion 242A because mode conversion requires matching effective refractive indices between the waveguide modes. There is substantially no conversion between the slab waveguide 241 and the second slab waveguide portion 242B due to effective refractive index mismatch. This enables one to reduce light leaking from the first optical mode 211 into the second optical mode 212 directly from underneath the out-coupling region 214, causing the light portion 125 out-coupled by the out-coupling region 214 to mostly include light that has traveled to the reflector 221 and back.

Figure 3:
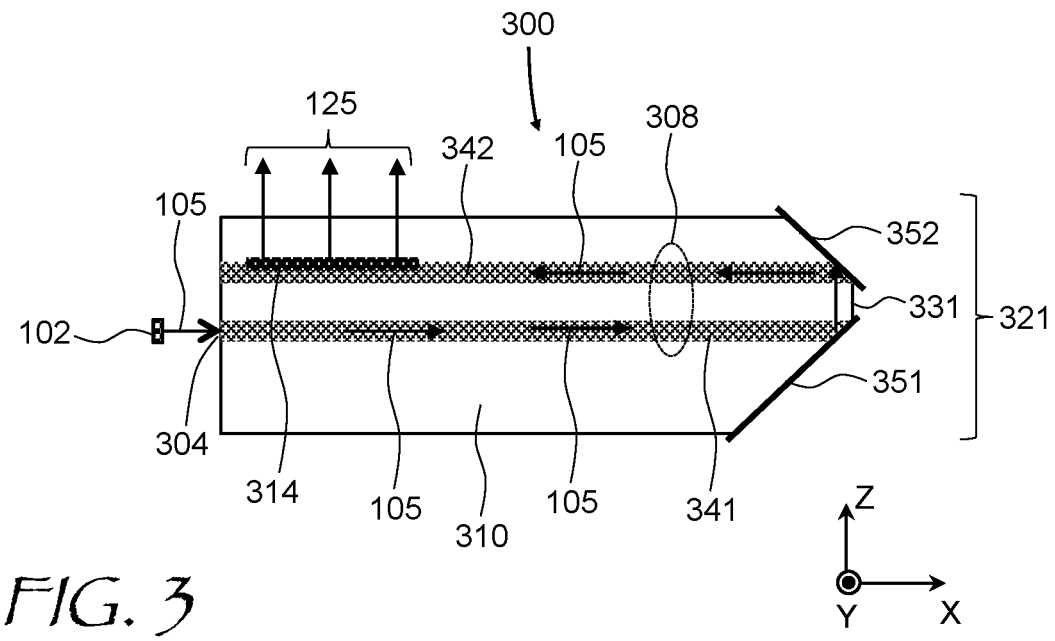
FIG. 3 is a side cross-sectional view of a waveguide illustrating forward and backward propagation of a light beam in a dual-core structure where individual cores are optically coupled by turning mirrors.

Referring to FIG. 3, a waveguide 300 is similar to the waveguide 100 of FIGS. 1A and 1B and the waveguide 200 of FIGS. 2A and 2B, and includes similar elements. The waveguide 300 of FIG. 3 includes an input port 304, a slab core structure 308 supported by a substrate 310, and an edge reflector 321 coupled to the slab core structure 308 at an edge 331 of the waveguide 300. An out-coupling region 314 is provided over the slab core structure 308.

The slab core structure 308 includes parallel first 341 and second 342 slab cores. The edge reflector 321 includes optically coupled first 351 and second 352 slanted reflectors. The first slanted reflector 351 is coupled to the first slab core 341 for reflecting the light beam 105 propagating in the first slab core 341 to the second slanted reflector 352. The second slanted reflector 352 is coupled to the second slab core for coupling the light beam 105 reflected by the second slanted reflector 352 into the second slab core 342. In operation, the array of light sources 102 emits a single light beam 105 or a plurality of light beams 105, each beam corresponding to a particular light source of the array 102. The light beam 105 is coupled at the input port 304 into the first slab waveguide 341, propagates in the first slab waveguide 341, is reflected by a first slanted reflector 351 towards the second slanted reflector 352, and is reflected by the second slanted reflector 352 into the second slab waveguide 342, propagates in the second slab waveguide 342, and at least the portion 125 of the light beam 105 is out-coupled at the out-coupling region 314. The first 351 and/or the second 352 reflectors may be curved in XY plane, i.e. may have optical power in XY plane for at least partial collimation of the light beam portion 125.

Figure 4:
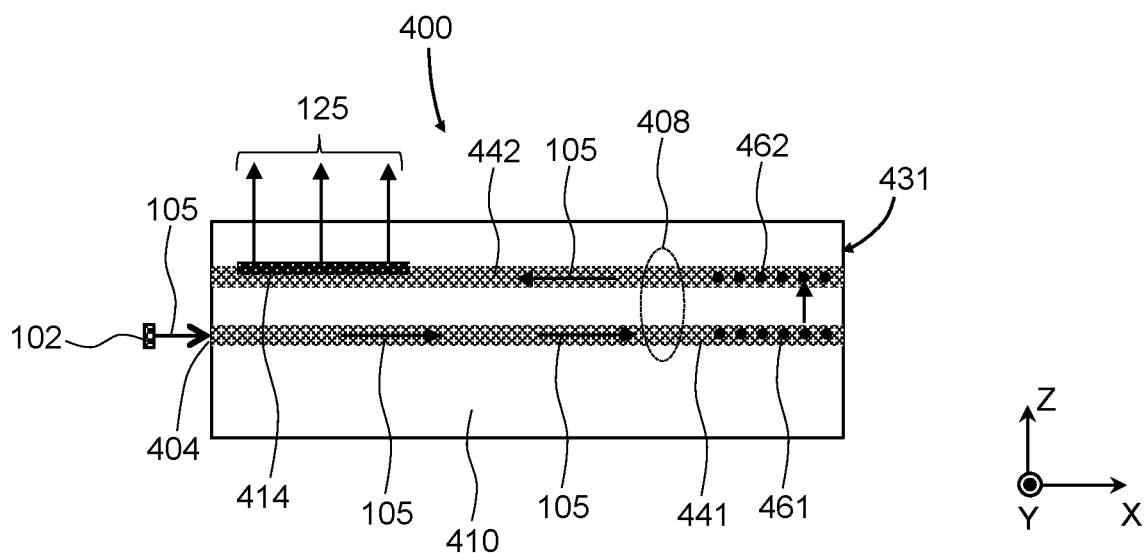
FIG. 4 is a side cross-sectional view of a waveguide showing forward and backward propagation, respectively, of a light beam in a dual-core structure where individual cores are coupled by diffractive reflectors.

Referring now to FIG. 4, a waveguide 400 is similar to the previously considered waveguides 100, 200, and 300, with diffractive reflectors used instead of slanted mirrors to couple light between core layers. The waveguide 400 of FIG. 4 includes the array of light sources 102 coupled to an input port 404, a slab core structure 408 supported by a substrate 410, and an out-coupling region 414 provided over the slab core structure 408.

The slab core structure 408 includes parallel first 441 and second 442 slab cores. The first slab core 441 comprises a first diffractive reflector 461. Parameters of the first diffractive reflector 461 such as grating contrast, pitch, slant angle, etc., are selected to out-couple the light beam 105 upwards, i.e. in the direction of thickness of the waveguide 400, towards the second slab core 442. The second slab core 442 comprises a second diffractive reflector 462 disposed e.g. proximate the edge 431, disposed over and optically coupled to the first diffractive reflector 461. Parameters of the second diffractive reflector 462 such as grating contrast, pitch, slant angle, etc., are selected to couple the light beam 105 redirected by the first diffractive reflector 461 into the second slab core 442, in the direction towards the outcoupling region 414. The term "diffractive reflector" used throughput this application may include, for example, a Bragg grating, a metasurface structure, a sub-wavelength grating, a Photonic Crystal (PhC), a PhC cavity, etc.

In operation, the array of light sources 102 emits at least one light beam 105, or a plurality of light beams 105, each beam corresponding to a particular light source of the array 102. The light beam 105 is coupled at the input port 404 into the first slab waveguide 441, propagates in the first slab waveguide 441, is redirected by the first diffractive reflector 461 towards the second diffractive reflector 462, and is redirected by the second diffractive reflector 462 to propagate in the second slab waveguide 442. The light beam 105 propagates in the second slab waveguide 342, and at least the portion 125 of the light beam 105 is out-coupled at the out-coupling region 414. The first 461 and second 462 diffractive reflectors may have optical power in XY plane, i.e. may be curved in XY plane, for at least partial collimation of the light beam portion 125.

Figure 5A:
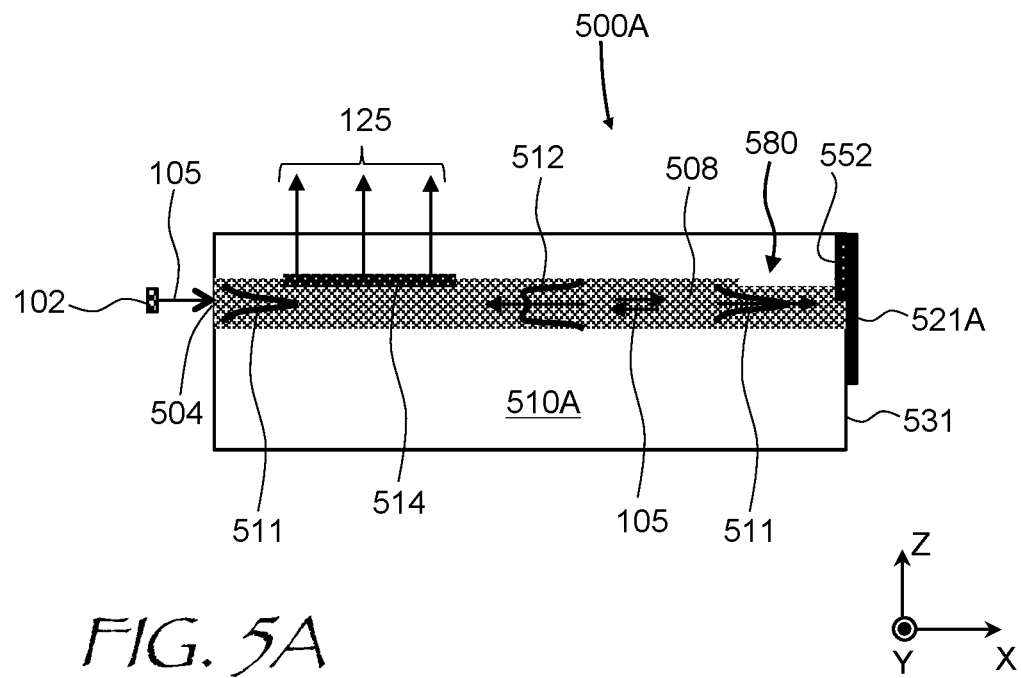
FIG. 5A is a side cross-sectional view of a waveguide showing forward and backward propagation, respectively, of a light beam in a few-mode core structure coupled to a stepped reflector at a distal edge of the waveguide.

Referring to FIG. 5A, a waveguide 500A is similar to the previously considered waveguides 100, 200, 300, and 400, and includes same or similar elements. The waveguide 500 includes a slab core structure 508 supported by a substrate 510. A reflector 521A is coupled to the slab core structure 508 at an edge 531 of the waveguide 500. The reflector 521A includes a step 552 for providing a half-wave phase shift for a portion of the light beam 105 reflecting the reflector 521A. An out-coupling region 514 is provided over the slab core structure 508. The slab core structure 508 includes a few-mode waveguide. Herein and throughout the rest of the specification, the term "few-mode waveguide" means a waveguide that supports not one but several lateral modes of propagation, for example at least 2, 3, 4, 5, or 6 modes, but no greater than 12 lateral modes.

In operation, the array of light sources 102 emits at least one light beam 105, or a plurality of light beams 105, each beam corresponding to a particular light source of the array 102. The light beam (or beams) 105 coupled at the input port 504 propagate in a first lateral mode 511 in the slab core structure 508. In this embodiment, the first mode 511 is a fundamental or $0^{th}$-order lateral mode of propagation. The light beam 105 propagates in the first lateral mode 511 until it reflects from the stepped reflector 521A, where at least a portion of the light beam 105 is converted from the first lateral mode 511 into a second lateral mode 512, which is in this case a higher-order lateral mode of propagation in the few-mode waveguide, for example, first-order mode, second-order mode, etc. The function of the step 552 of the stepped reflector 521A is to provide the phase shift necessary for the mode conversion from the first 511 to second 512 lateral optical modes. An etched region 580 may be provided in front of the stepped reflector 521A, since the waveguide thickness optimal for reflection into the second mode 512 is not the same as the waveguide thickness that maximizes out-coupling difference between the first 511 to second 512 optical modes. The light beam 105 in the second optical mode 512 propagates to the out-coupling area 514. Since the second optical mode 512 is broader laterally, i.e. in Z-direction in FIG. 5, the second optical mode 512 gets out-coupled at the out-coupling region 514 much more efficiently than the first ($0^{th}$-order) mode 511. The portion 125 of the light beam 105 is out-coupled at the out-coupling region 514. The stepped reflector 521A may have optical power in XY plane, i.e. may be curved in XY plane, for at least partial collimation, or full collimation, of the light beam portion 125.

Figure 5B:
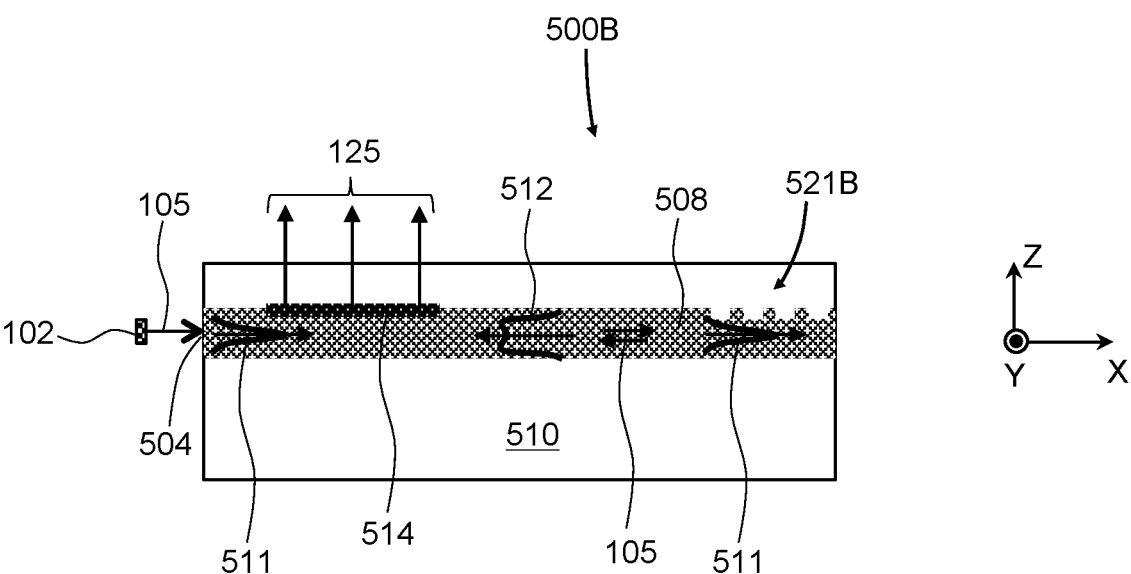
FIG. 5B is a side cross-sectional view of a waveguide showing forward and backward propagation, respectively, of a light beam in a few-mode core structure coupled to a diffractive reflector at a distal edge of the waveguide.

Turning now to FIG. 5B, a waveguide 500B is a variant of the waveguide 500 of FIG. 5A. The waveguide 500B of FIG. 5B includes a diffractive reflector 521B coupled to, or formed in the slab core structure 508. The diffractive reflector 521B is configured to convert at least a portion of the light beam 105 from the first lateral optical mode 511 of the few-mode waveguide to the second lateral optical mode 512, in this example from the fundamental or $0^{th}$-order mode to a higher-order mode, upon reflection from the diffractive reflector 521B. An out-coupling region 614 is provided over the slab core structure 508.

In operation, the array of light sources 102 emits at least one light beam 105, or a plurality of light beams 105, each beam corresponding to a particular light source of the array 102. The light beam or beams 105 coupled at the input port 504 propagates in the first lateral mode 511 in the slab core structure 508. The light beam 105 propagates in the first lateral mode 511 until it reflects from the diffractive reflector 521B, where at least a portion of the light beam 105 is converted from the first lateral mode 511 into a second lateral mode 512, which is in this case a higher-order lateral mode of propagation in the few-mode waveguide, for example, a first-order mode, a second-order mode, etc. The light beam 105 in the second optical mode 512 propagates to the out-coupling area 514. Since the second optical mode 512 is less confined, or in other words, is broader laterally, i.e. in Z-direction in FIG. 5B, the second optical mode 512 gets out-coupled at the out-coupling region 514 much more efficiently than the first ($0^{th}$-order) mode 511. The portion 125 of the light beam 105 is out-coupled at the out-coupling region 614. The diffractive reflector 521B may have optical power in XY plane, i.e. may be curved in XY plane, for at least partial collimation, or full collimation, of the light beam portion 125.

The mode conversion may be provided by the diffractive reflector 521B by selecting a grating pitch defined by the following formula:

$$P = \lambda / (n^0_{\textit{eff}} + n^1_{\textit{eff}}) \tag{1}$$

where $\lambda$ is a wavelength of the light beam, $n^0_{\textit{eff}}$ is an effective refractive index for the zero-order mode, and $n^1_{\textit{eff}}$ is an effective refractive index for the higher order mode.

Various configurations of the slab core structures 508 of FIGS. 5A and 5B are possible. In some embodiments, the slab core structure includes a multimode interference (MMI) coupler. A reflector may be provided at the distal edge of the MMI coupler. In such a configuration, the MMI coupler may have a length and geometrical dimensions to provide a conversion of the injected mode at the input port into a different, less confined mode at the out-coupling region, to enable the out-coupling region to selectively out-couple the less confined mode from the waveguide.

Figure 6A:
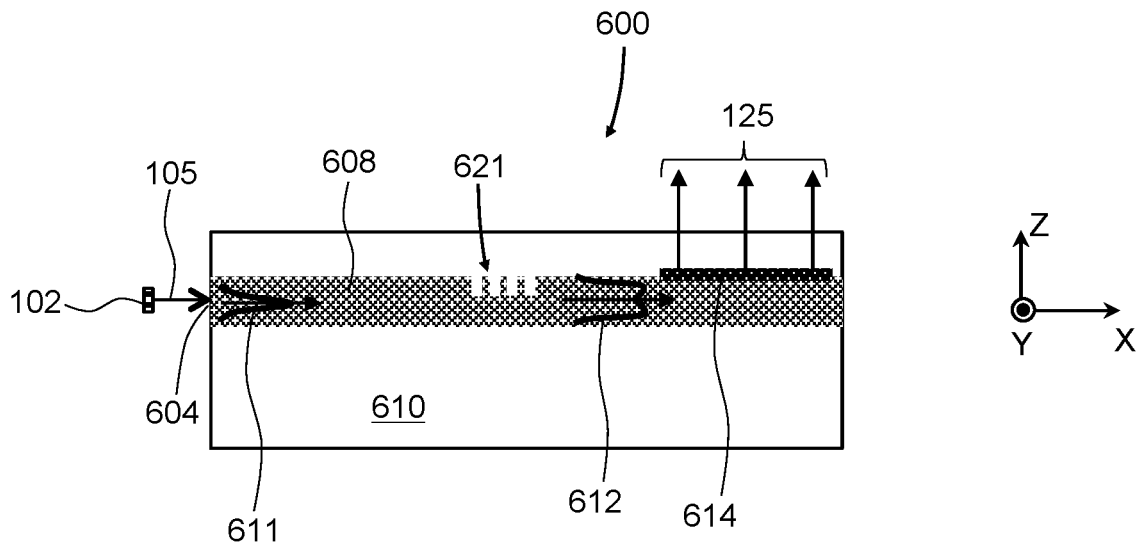
FIG. 6A is a side cross-sectional view of a waveguide propagation, of a light beam in a few-mode core including an intermodal coupler having optical power.
Figure 6B:
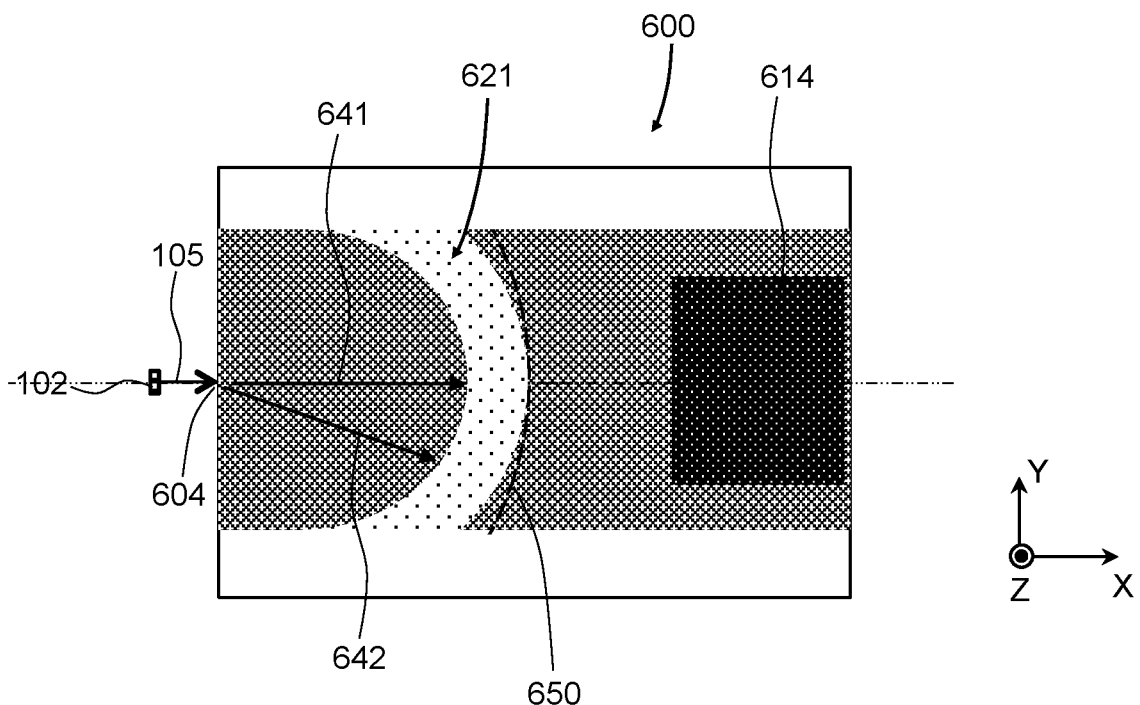
FIG. 6B is a plan view of the waveguide of FIG. 6A.

Referring to FIGS. 6A and 6B, a waveguide 600 includes an input port 604 for in-coupling the light beam 105 emitted by the light source array 102 into a first optical mode of propagation 611 in a slab core structure 608, which supports the first optical mode of propagation 611, e.g. a $0^{th}$ order mode, and a second optical mode of propagation 612, e.g. a $1^{st}$ optical mode of propagation. The slab core structure 608 includes an intermodal coupler 621 for conversion of the light beam 105 from the first optical mode 611 to the second optical mode 612 upon propagation in the intermodal coupler 621. An out-coupling region 614 is provided downstream of the intermodal coupler 621, e.g. a grating coupler operating in transmission, for out-coupling a portion 125 of the light beam 105 propagating in the second optical mode 612.

In operation, the light beam 102 is in-coupled into the slab core structure 608 and propagates in the first optical mode 611 towards the intermodal coupler 621, which converts the light beam 105 from the first optical mode 611 to the second optical mode 612. In the illustrated embodiment, the first 611 and second 612 optical modes have different effective refractive indices. The intermodal coupler 621 includes a grating shaped in a plane of the slab core structure 608, i.e. XY plane, such that different rays of the light beam 105 have different optical path lengths in XY plane from the input port 604 to the grating. For example, referring specifically to FIG. 6B, an optical path length between the input port 604 and the intermodal coupler 621 is longer for a central ray 641 of the light beam 105 than for a side ray 642. The first optical mode 611 has a higher effective index of refraction than the second optical mode 612. Therefore, on its way to an arc 650 centered at the input port 604, the central ray 641 will travel a longer distance in the first optical mode 611 than the side ray 642, which will cause the central ray 641 to arrive at the arc 650 with a phase delay, causing the light beam 105 to become more collimated in XY plane. By selecting the shape of the intermodal coupler 621 in XY plane, one may provide a required phase delay function, corresponding to focusing, defocusing, and/or correcting optical aberrations of the optical system. It is further noted that the waveguide 600 may include a reflective configuration for intermodal coupling considered above with reference to FIGS. 1A, 1B to FIGS. 5A, 5B, and vice versa: the waveguides of FIGS. 1A, 1B to FIGS. 5A, 5B may include a transmissive intermodal coupler, such as the intermodal coupler 621 of FIGS. 6A and 6B.

Figure 7A:
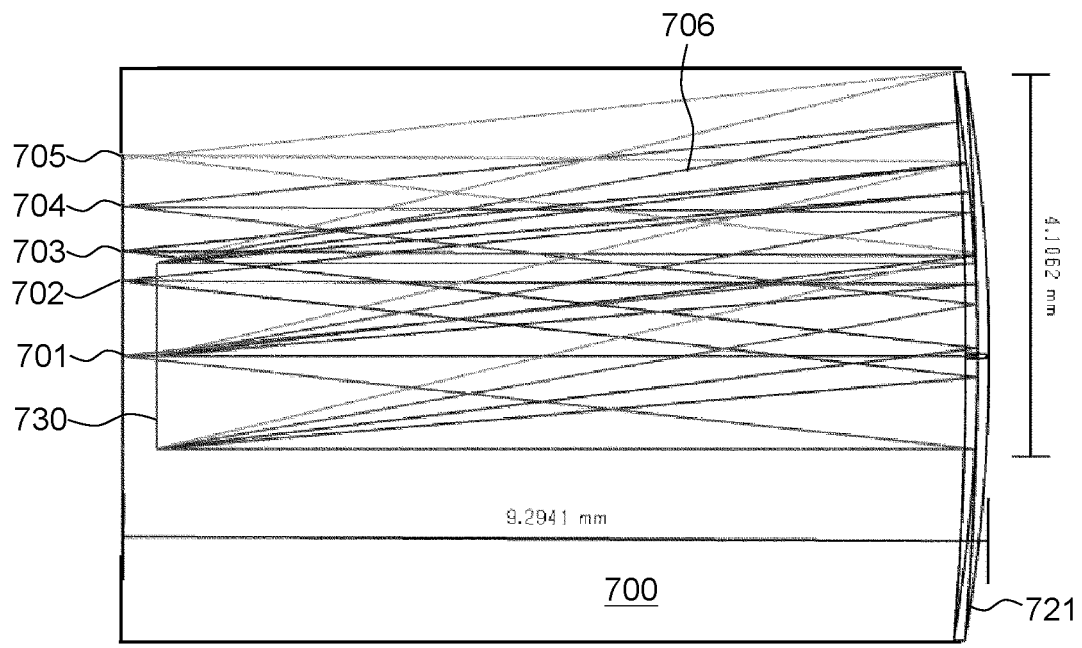
FIG. 7A is a plan ray-traced view of a waveguide with a single reflector.
Figure 7B:
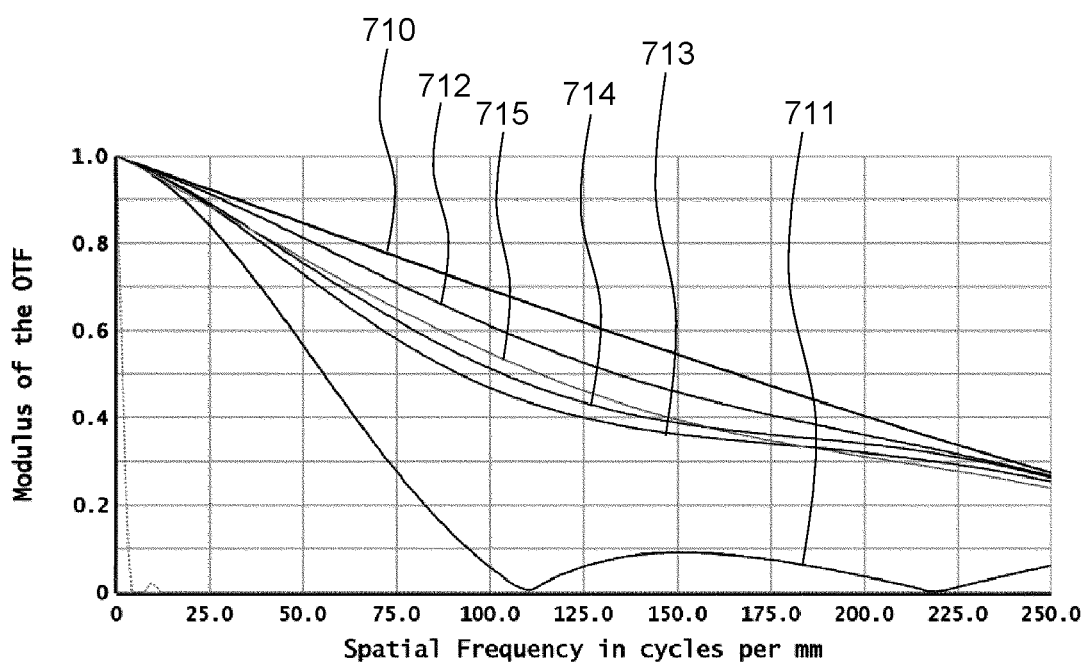
FIG. 7B is a plot of optical transfer function (OTF) of the waveguide of FIG. 7A for different field angles.

Optical performance of waveguides of FIGS. 1A, 1B to FIGS. 5A, 5B will now be considered. Referring first to FIG. 7A, a waveguide of this disclosure is shown in a plan view. A waveguide 700 has a curved reflector 721 at an edge of the waveguide 700, configured for collimation of the injected light. The curved reflector 721 represents reflectors, or their grating equivalents, of the waveguides 100, 200, 300, 400, 500A, and 500B of FIG. 1A, B to FIGS. 5A, 5B. In other words, the curved reflector 721 of FIG. 7A may be implemented as reflected surface, diffractive reflector, etc., and does not have to be located at the edge of the waveguide 700A. To determine optical performance of the waveguide 700A having a single curved reflector, rays 706 were traced backwards, that is, from the collimated state at an exit pupil 730 to focal spots 701, 702, 703, 704, and 705 at a focal plane 730. Different focal spots 701, 702, 703, 704, and 705 correspond to different angles of the collimated light beams forming the spots. The different beam angles are also termed herein "field angles". Optical aberrations at various field angles may be evaluated by analyzing how well collimated light beams at different field angles are focused by the curved reflector 721 after the shape of the curved reflector 721 has been optimized using optical design software. For example, referring to FIG. 7B, modulus of optical transfer function (OTF) has been calculated for the field angles of FIG. 7A vs. spatial frequency in cycles per mm. Different OTFs 711, 712, 713, 714, and 715 correspond to the focal spots 701, 702, 703, 704, and 705, respectively, at the focal plane 732. Diffraction limit is represented by an ideal OTF curve 710. The following Table 1 lists the field angles for the OTFs 711, 712, 713, 714, and 715.

TABLE 1

| | Focal spot # | | | | |
|---|---|---|---|---|---|
| | 701 | 702 | 703 | 704 | 705 |
| | | | OTF # | | |
| | 711 | 712 | 713 | 714 | 715 |
| Field angle (tangential), degrees | 0 | 5 | 7 | 10 | 13.5 |

The field angles of +−13.5 degrees correspond to field angles of +−20 degrees in air, which may be not sufficient for wide-FOV near eye display applications.

Figure 8A:
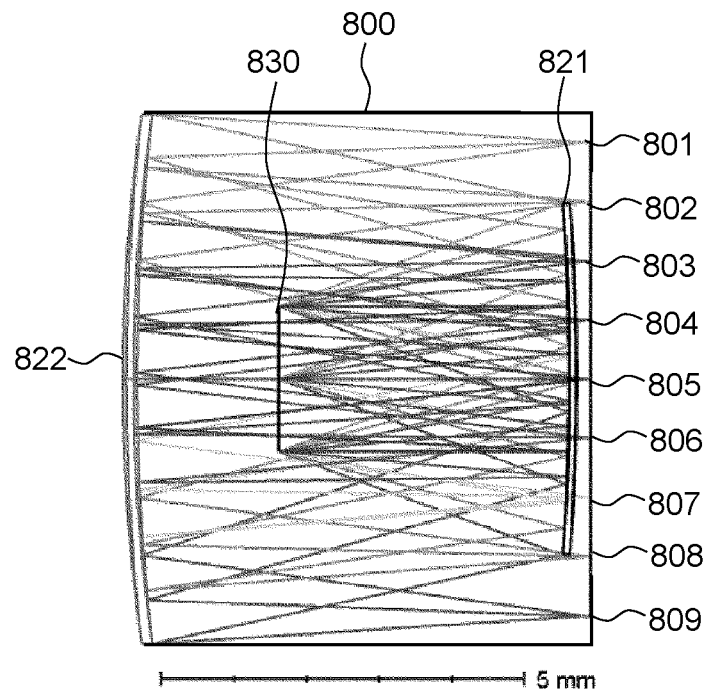
FIG. 8A is a plan ray-traced view of a waveguide with a pair of opposed coaxial reflectors.

To better balance optical aberrations and/or to increase the field of view of a waveguide-based 1D projector, a second reflector may be provided in the waveguide. A coaxial orientation of both reflectors or their grating equivalents may allow better aberration balancing. FIG. 8A illustrates an optical configuration of a waveguide 800 including first 821 and second 822 coaxial curved reflectors at opposed faces of the waveguide 800. Similarly to FIG. 7A, rays 800 in FIG. 8A have been traced backwards, that is, from the collimated state at an exit pupil 830 to focal spots 801, 802, 803, 804, 805, 806, 807, 808, and 809. Different focal spots 801-809 correspond to different angles of the collimated light beams forming the focal spots 801-809. The different beam angles are also termed "field angles". Optical aberrations at various field angles may be evaluated by analyzing how well collimated light beams at different field angles are focused by the first 821 and second 822 curved reflectors. The shape of the first 821 and second 822 curved reflectors has been optimized by optical design software. The first 821 and second 822 curved reflectors are meant only as an example of a reflector. Other types of reflectors, e.g. diffractive reflectors, may be used.

Figure 8B:
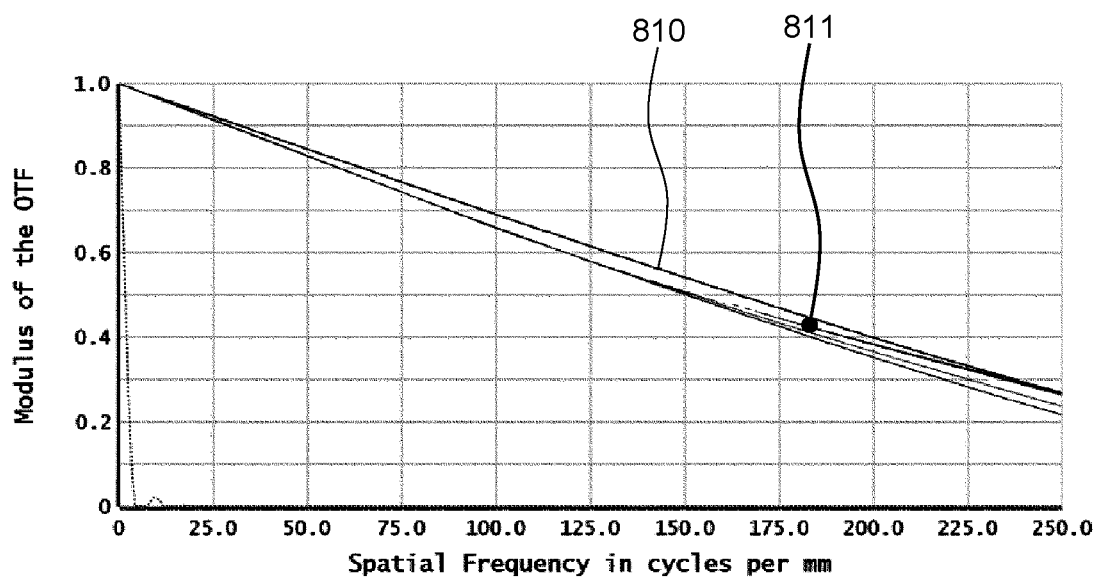
FIG. 8B is a plot of optical transfer function (OTF) of the waveguide of FIG. 8A for different field angles.

The results of OTF computations are presented in FIG. 8B, where the OTF modulus 811 has been computed for the field angles ranging from −30 degrees to +30 degrees in air. The OTF curves corresponding to the spots 801-809 are disposed close to one another and thus are labeled by a single reference numeral 811 for simplicity. It is seen that at all the field angles, the OTF performance is very close to the best theoretically achievable, diffraction-limited performance represented by an ideal OTF curve 810, for +−30 degrees FOV. The optical aberrations of two-reflector and one-reflector waveguide configurations considered herein may be mitigated by providing a transmissive intermode coupler similar to the intermode coupler 621 of FIGS. 6A and 6B, into the waveguide configuration.

Examples of optical configurations of dual-reflector waveguide will now be considered.

Figure 9A:
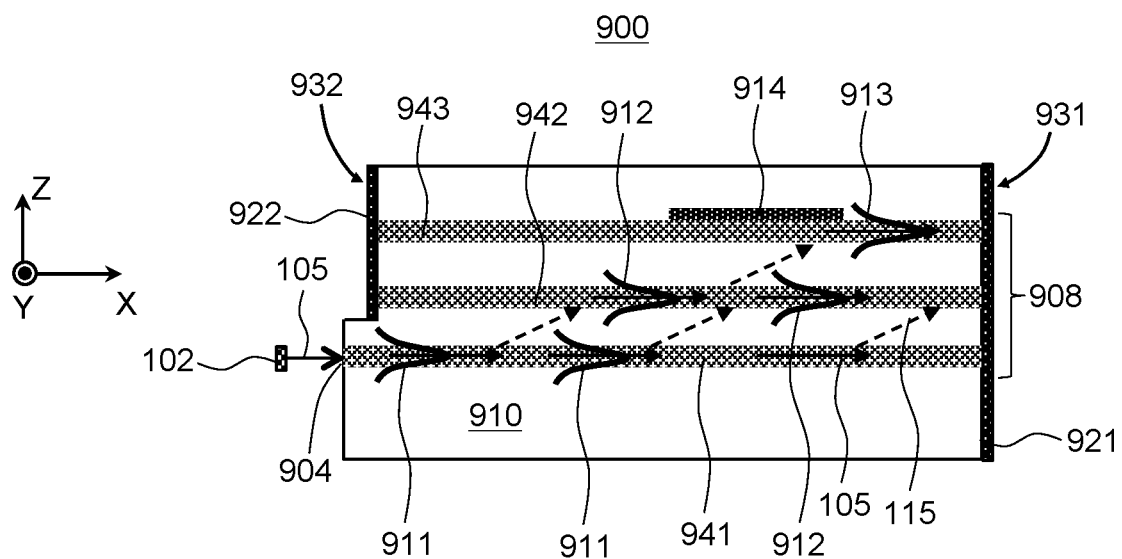
FIGS. 9A, 9B, and 9C are side cross-sectional views of a waveguide having a pair of opposed edge reflectors, the views showing forward, backward, and second forward propagation, respectively, of a light beam a slab core structure including three evanescently coupled cores.
Figure 9B:
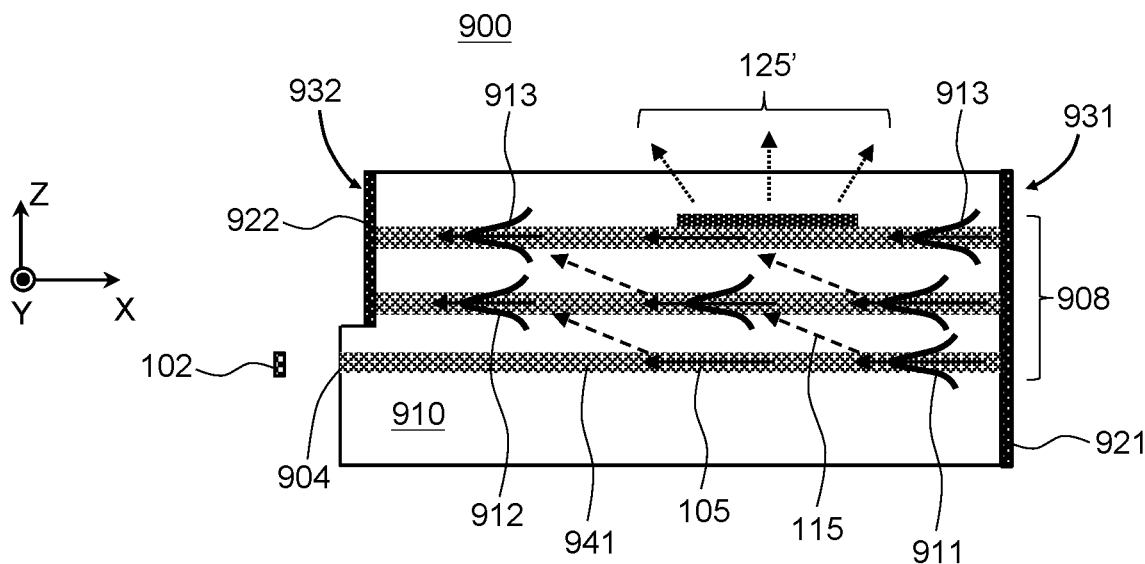
Figure 9C:
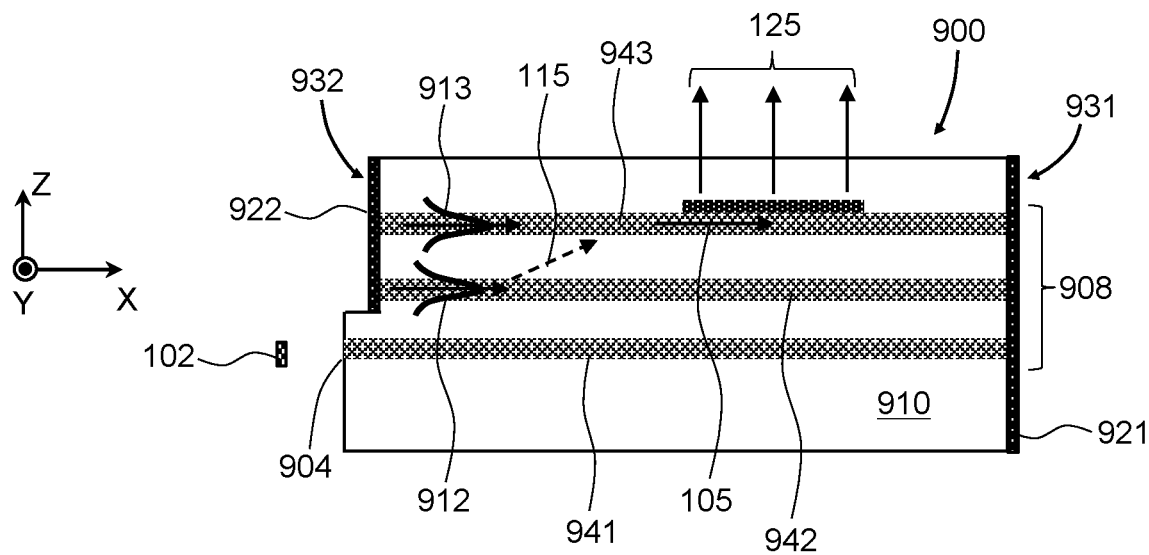

Referring first to FIGS. 9A, 9B, and 9C, a waveguide 900 is similar to the waveguide 100 of FIGS. 1A and 1B. The waveguide 900 of FIGS. 9A-9C an input port 904 for injection of the light 105 into a slab core structure 908 optionally supported by a substrate 910. First 921 and second 922 coaxial reflectors are coupled to the slab core structure 908 at opposed first 931 and second 932 edges of the waveguide 900. An out-coupling region 914 is provided over the slab core structure 908 between the first 921 and second 922 reflectors, for out-coupling of light propagated in the slab core structure 908. The first 921 and second 922 reflectors may be curved in XY plane to have focusing power in XY plane, i.e. in the plane of the waveguide 900, for collimation of the light beam 105 received at the input port 904 of the waveguide 900 and out-coupled at the out-coupling region 914 of the waveguide 900. Coaxial orientation of the first 921 and second 922 curved reflectors facilitates reduction of optical aberrations, as shown above with reference to FIGS. 8A and 8B.

The slab core structure 908 includes parallel evanescently coupled first 941, second 942, and third 943 slab cores, e.g. singlemode or few-mode cores. The first 941, second 942, and third 943 slab cores are offset from one another in a direction of thickness of the waveguide 100, i.e. along Z-axis in FIGS. 9A, 9B, and 9C. The slab core structure 908 supports first 911, second 912, and third 913 optical modes of propagation of in-coupled light in the first 941, second 942, and third 943 slab cores respectively. In operation, each light source of the array of light sources 102 may emit a light beam. The light beams from different light sources are offset in Y-direction. At least one light beam 105 may be emitted (FIG. 9A). The light beam 105 is coupled at the input port 904 into the first slab core 941 supporting the first optical mode 911. The light beam 105 propagates towards the first edge 931 of the waveguide 900. The first reflector 921 disposed opposite the input port 904 reflects the light beam 105 to propagate back in the slab core structure 908 (FIG. 9B), towards the second edge 932. The waveguide 900 is configured to convert the light beam 105 from the first optical mode 911 to the second optical mode 912 and further to the third optical mode 913 upon propagation in the slab core structure 908 towards the first reflector 921 (FIG. 9A), back towards the second reflector 922 (FIG. 9B), and forward again, towards the out-coupling area 914 (FIG. 9C) after reflecting from the second reflector 922. The intermodal transitions are denoted with the dashed arrows 115. To provide the required coupling of the light energy from the first optical mode 911 to the second optical mode 911 and further to the third optical mode 913, the first 941, second 942, and third 943 slab cores may be offset from one another by a distance (separation) in the direction of thickness of the waveguide 900, i.e. in Z-direction, at which a major portion, e.g. at least 50%, 60%, 70%, 80%, 90%, or more, of the light beam 105 is converted from the first optical mode 911 propagating in the first slab core 941 to the third optical mode 913 propagating in the third slab core 943 via the second optical mode 911 propagating in the second slab core 142 when the light beam 105 reflected from the both the first 921 and second 922 reflectors reaches the out-coupling region 914. It is noted that the conversion of the light beam 105 from the first optical mode 911 to the second optical mode 912 and further to the third optical mode 913 is performed along the entire optical path of propagation of the light beam 105 from the input port 904 to the first reflector 921 (i.e. in the positive direction of X-axis), back to the second reflector 922 (i.e. in the negative direction of X-axis), and to the out-coupling region 914 (in the positive direction of X-axis), as illustrated in FIGS. 9A, 9B, and 9C.

The function of the out-coupling region 914 is to out-couple at least the portion 125 of the light beam 105 propagating in the third optical mode 913 (i.e. in the third slab core 943) from the waveguide 900. The out-coupling region 914 may be disposed and configured to maximize the portion 125 of the light beam propagating in the third slab core 913 after reflection from the second reflector 922 i.e. in the direction of X-axis, while reducing the unwanted out-coupling of light 125' propagating in the third slab core 913 from the first reflector 921 to the second reflector 922. The out-coupling region 914 may include, for example, an out-coupler evanescently coupled to the third slab core 943. The out-coupler may include an optical element such as a prism, a transparent plate, a prismatic mirror, a diffraction grating, etc., having a refractive index higher than the effective refractive index for the third optical mode 913 propagating in the third slab core 943. The first 921 and second 922 reflectors may have optical power, i.e. focusing or defocusing power, for at least partial collimation of the light beam 105 received at the input port 904 in a plane of the slab core structure, i.e. in XY plane in FIGS. 9A, 9B, and 9C.

When the array of light sources 102 is energized, each light source provides a light beam to be collimated by the pair of coaxial first 921 and second 922 reflectors to propagate at an angle specific to that particular light source. When different light sources are energized, the waveguide 900 produces a fan of collimated light beams originating at the out-coupling region 914, each light beam being independently adjustable in brightness and/or color or emission wavelength.

Figure 10:
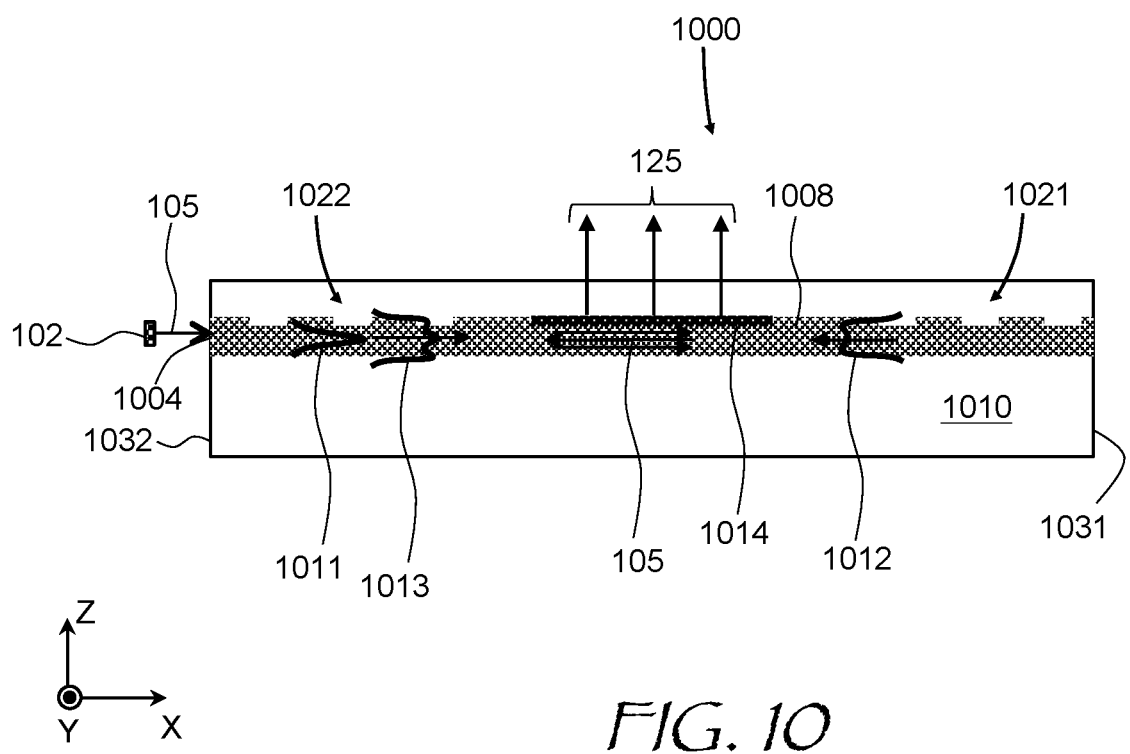
FIG. 10 is a side cross-sectional view of a waveguide showing forward and backward propagation of a light beam in a few-mode core structure coupled to a pair of opposed diffractive reflectors.

Referring to FIG. 10, a waveguide 1000 is similar to the waveguide 500B of FIG. 5B, and includes similar elements. The waveguide 1000 of FIG. 10 includes an input port 1004 for coupling the light 105 emitted by the array of light sources 102 into a slab core structure 1008 optionally supported by a substrate 1010. The slab core structure 1008 includes a few-mode waveguide supporting at least first, second, and third lateral modes of propagation having different degrees of confinement to the slab core structure 1008. First 1021 and second 1022 diffractive reflectors are coupled to the slab core structure 1008 proximate opposed first 1031 and second 1032 edges of the waveguide 1000, as shown. The first diffractive reflector 1021 is configured to convert at least a portion of the light beam 105 from a first lateral optical mode 1011 of the few-mode waveguide to a second lateral optical mode 1012, in this example from the fundamental or $0^{th}$-order mode to a higher-order mode of the few-mode waveguide, upon reflection from the first diffractive reflector 1021. The second diffractive reflector 1022 is configured to convert at least a portion of the light beam 105 from the second mode 1012 to a third lateral optical mode 1013, that is, to another higher-order mode of the few-mode waveguide, upon reflection from the second diffractive reflector 1022.

An out-coupling region 1014 is provided over the slab core structure 1008 between the first 1021 and second 1022 diffractive reflectors, for out-coupling of light propagated in the slab core structure 1008. The first 1021 and second 1022 diffractive reflectors may be curved in XY plane to have optical power in XY plane, i.e. in the plane of the waveguide 1000, for collimation of the light beam 105 received at the input port 1004 of the waveguide 1000 and out-coupled at the out-coupling region 1014 of the waveguide 1000. Coaxial orientation of the first 1021 and second 1022 curved diffractive reflectors may facilitate reduction of optical aberrations.

In operation, the array of light sources 102 emits at least one light beam 105, or a plurality of light beams 105, each beam corresponding to a particular light source of the array 102. The light beam 105 is coupled at the input port 604. Then, the light beam 105 propagates in the first lateral mode 1011, i.e. the fundamental mode. The light beam 105 propagates in the first lateral mode 1011 through the second diffractive reflector 1022 without reflection, since the second diffractive reflector 1022 only reflects light in the second 1012 and third 1013 optical modes. The light beam 105 reflects from the first diffractive reflector 1021, where at least a portion of the light beam 105 is converted from the first lateral mode 1011 into a second lateral mode 1012, such as a higher-order lateral mode of propagation in the few-mode waveguide, for example, first-order mode. The light beam 105 in the second optical mode 1012 propagates back past the out-coupling region 1014 towards the second diffractive reflector 1022. The light beam 105 reflects from the second diffractive reflector 1022, where at least a portion of the light beam 105 is converted from the second lateral mode 1012 into the third lateral mode 1013, which is in this case a higher-order lateral mode of propagation less confined than the second lateral mode 1012, for example, second-order mode. Then, the light beam 105 propagates back to the out-coupling area 614. Since the third optical mode 1013 is less confined, or in other words, is broader laterally, i.e. in Z-direction in FIG. 10 than the second (first-order) optical mode 1012 or the first ($0^{th}$-order) optical mode 1011, the third optical mode 1013 gets out-coupled at the out-coupling region 1014 much more efficiently than the second (first-order) optical mode 1012 or first ($0^{th}$-order) mode 1011. The portion 125 of the light beam 105 is out-coupled at the out-coupling region 1014.

The grating pitch $P_1$ of the first diffractive reflector 1021 and the grating pitch $P_2$ of the second diffractive reflector 1022 may be selected in accordance with the following formulas:

$$P_1 = \lambda/(n^1_{eff} + n^2_{eff}) \quad (2)$$

$$P_2 = \lambda/(n^2_{eff} + n^3_{eff}) \quad (3)$$

where $\lambda$ is a wavelength of the light beam, $n^1_{eff}$ is an effective refractive index for the first optical mode 1011, and $n^2_{eff}$ is an effective refractive index for the second optical mode 1012, and $n^3_{eff}$ is an effective refractive index for the third optical mode 1013.

It follows from Eqs. (2) and (3) that the optical performance of the waveguide 1000 is somewhat wavelength-dependent. For example, in a 2 micrometers thick silica waveguide with a 2% refractive index core, the mode refractive indices are: $n^1_{eff}$=1.487091, $n^2_{eff}$=1.477267, and $n^1_{eff}$=1.463484. For the light beam at the wavelength of 520 nm, the grating pitch $P_1$ is 176.83 nm, and the grating pitch $P_2$ is 175.42 nm. The full spectral bandwidth $\Delta\lambda/\lambda$ may be calculated as follows:

$$\Delta\lambda/\lambda \approx 2(P_1 - P_2)/(P_1 + P_2) \quad (4)$$

With the above parameters entered into Eq. (4), $\Delta\lambda/\lambda$ is 4.2 nm.

It is to be noted that the projector implementation of the waveguides considered herein, i.e. projectors including waveguides coupled to the array of light sources 102, where the waveguides collimate the light beams 105 emitted by the array of light sources 102, is meant only as an example. Many other optical devices, such as for example backlights, scanners, imaging devices, sensors, etc., may be based on the "integrated optical bench" technology disclosed herein and illustrated with e.g. the waveguide embodiments of FIGS. 1A, 1B to FIG. 13A. Various reflector and intermode coupler configurations considered herein may be combined in a waveguide device, depending on its intended function. Furthermore, other active and passive optical components may be added depending on the intended function, such as an array of laser pixels, heterogeneously integrated tunable lasers, 1D waveguides, Y-splitters, directional couplers, Mach-Zehnder interferometers (MZIs), polarization control elements, phase shifters, etc.

Numerical simulations have been undertaken to illustrate and verify various concepts considered herein.

Figure 11A:
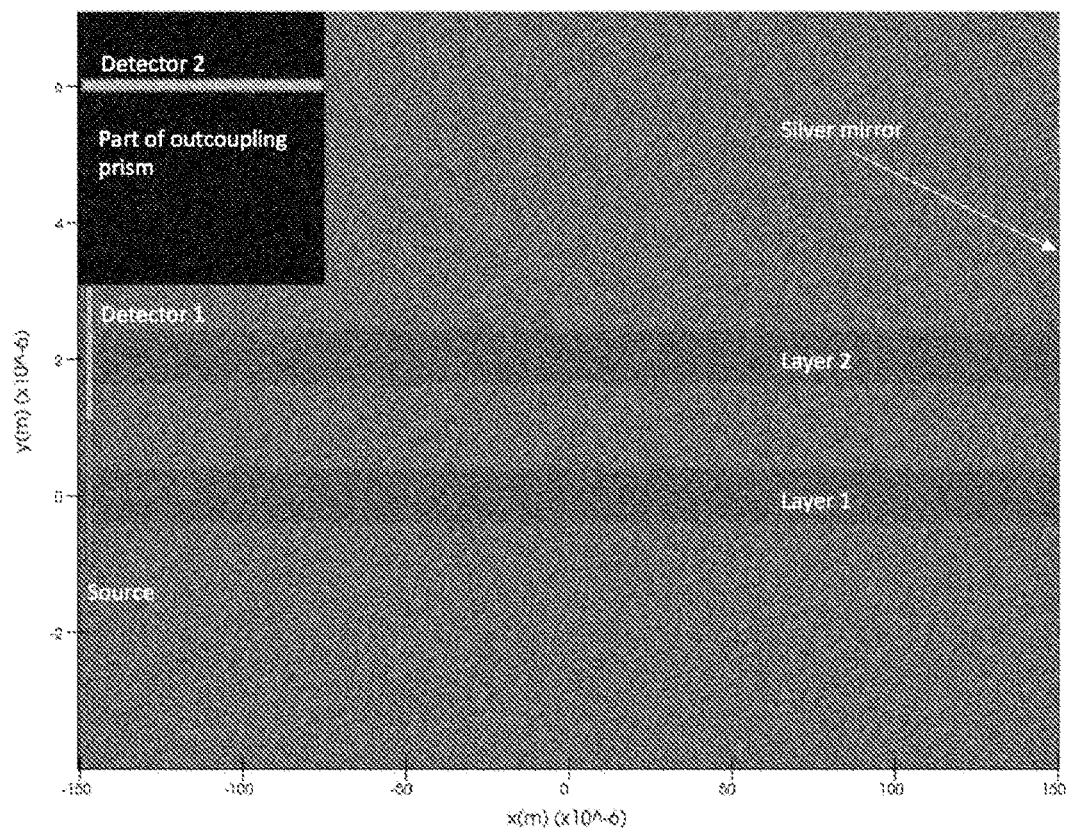
FIG. 11A is an example refractive index map of the waveguide of FIGS. 1A and 1B.

FIG. 11A illustrates a numerical simulation setup for the waveguide 100 of FIGS. 1A and 1B. The source light is coupled into Layer 1 from the left-hand side in FIG. 11A. Layer 1 corresponds to the first slab layer 141 in FIGS. 1A and 1B. The light is coupled into Layer 2 upon reflection from a silver mirror. Detector 1 senses both the irradiance and direction of the illuminating light beam. Detector 1 covers both slab waveguide Layers 1 and 2. Detector 2 senses light out-coupled by an out-coupling prism disposed at the out-coupling region 114 (FIGS. 1A and 1B).

Figure 11B:
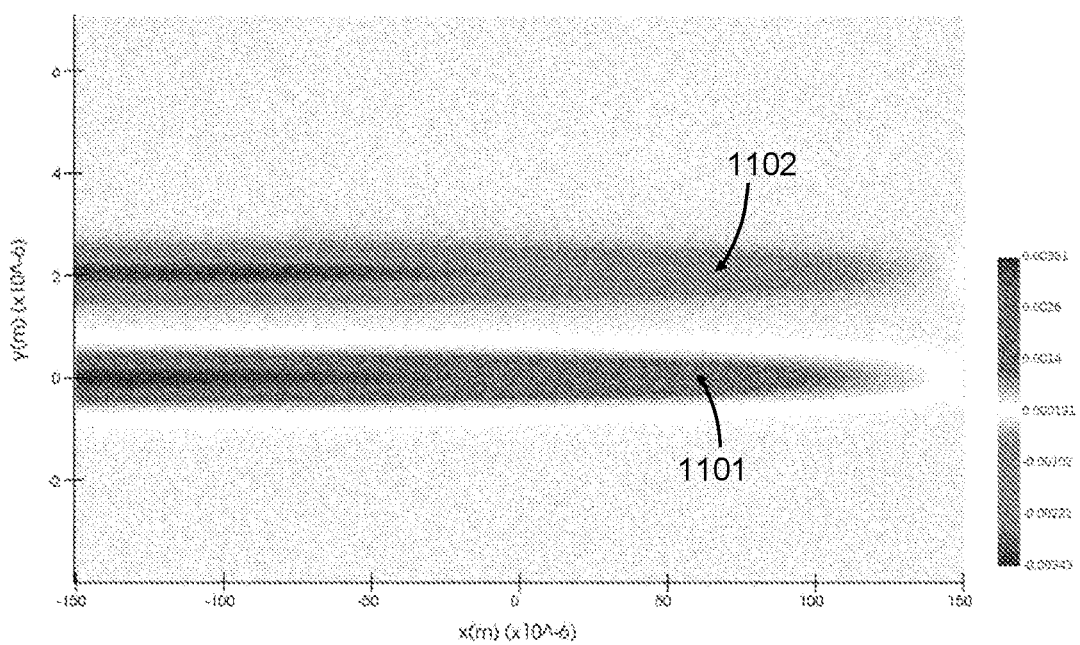
FIG. 11B is an irradiance map computed for the waveguide configuration of FIG. 11A.

FIG. 11B shows a result of the simulation. FIG. 11B is a heat map showing the irradiance at different locations of Detector 1 along the length dimension of the waveguide (left to right in FIGS. 11A and 11B). Layer 1 irradiance map 1101 (FIG. 11B) shows the irradiance decreasing in in going from left to right, i.e. in the direction of light propagation in Layer 1 before reflection form the silver mirror. Layer 2 irradiance map 1102 shows the irradiance increasing in in going from right to left, i.e. in the direction of light propagation in Layer 2 after reflection form the silver mirror.

Figure 11C:
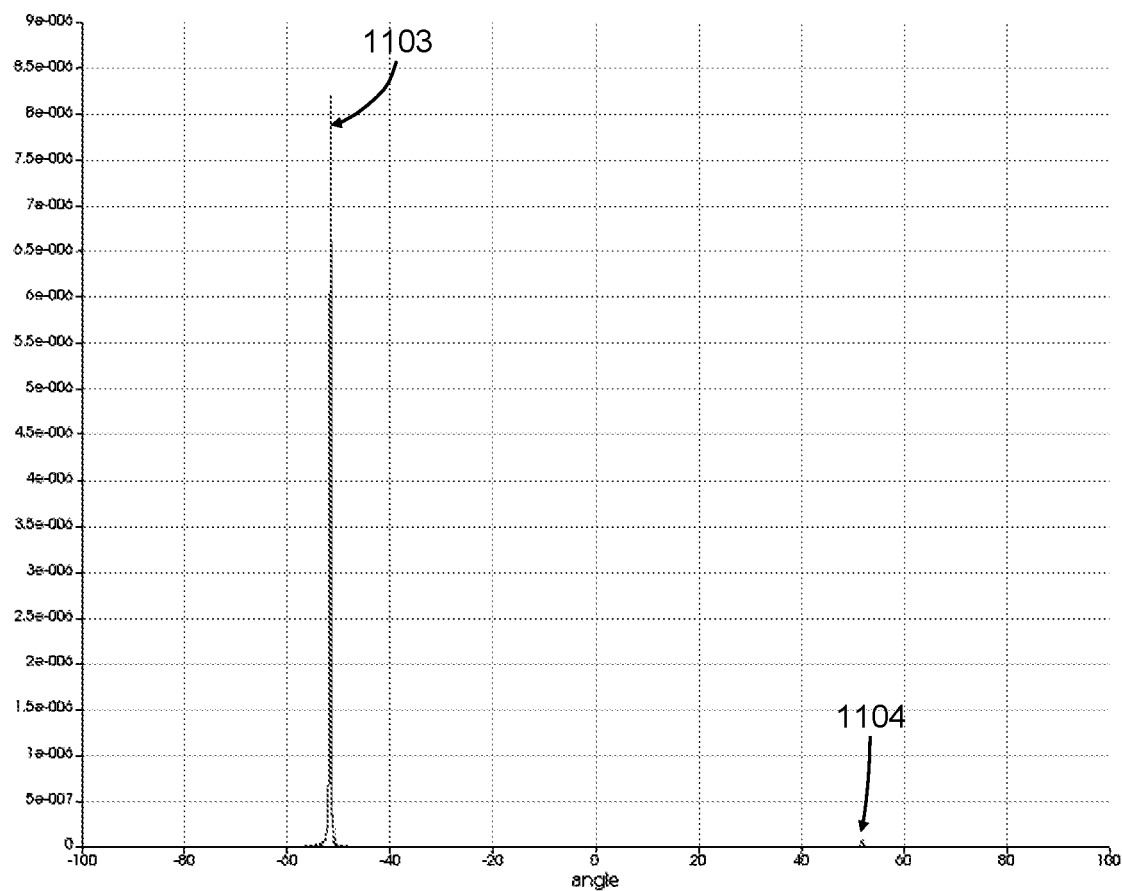
FIG. 11C is a far field angular irradiance distribution plot computed for the waveguide configuration of FIG. 11A.
Figure 11D:
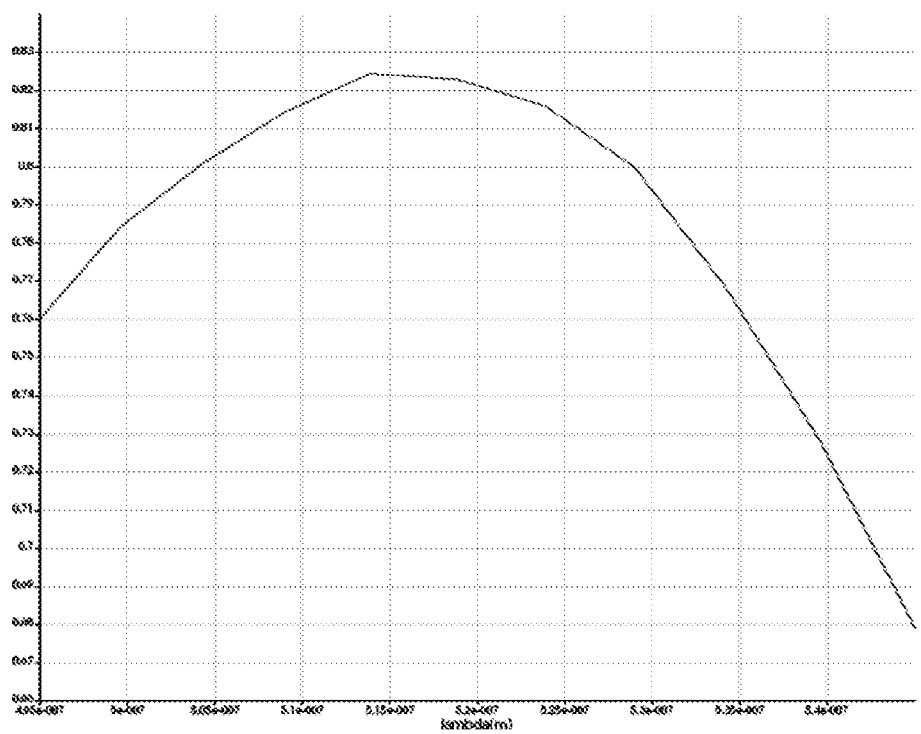
FIGS. 11D and 11E are spectral plots of irradiance received by Detectors 1 and 2, respectively, shown in the refractive index map of FIG. 11A.
Figure 11E:
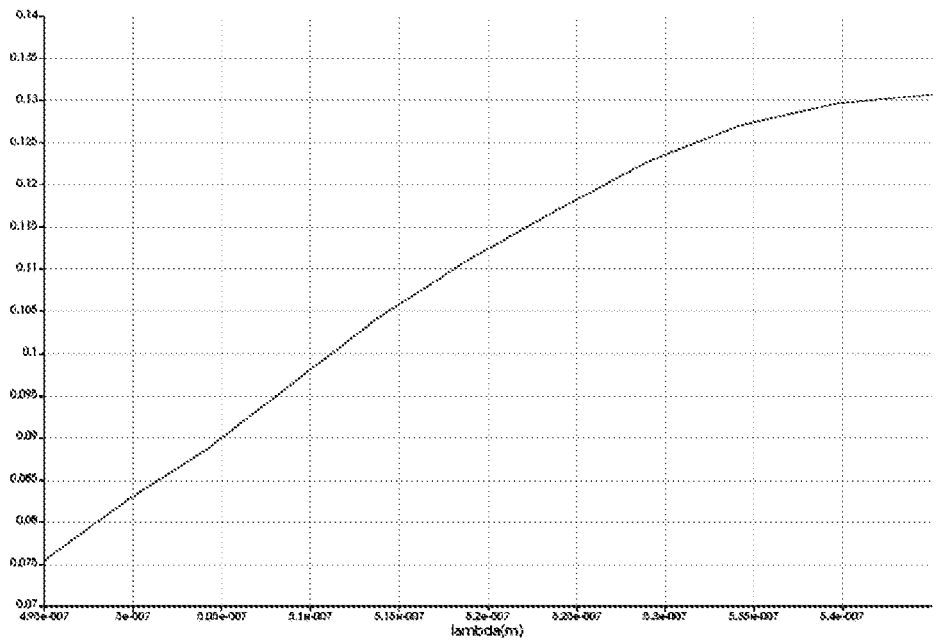

FIG. 11C shows the signal on Detector 2 as a function of the beam angle. A main peak 1103 corresponds to a beam angle of a light beam that propagated from right to left in Layer 2, i.e. as intended in the waveguide 100 of FIGS. 1A and 1B. A much smaller peak 1104 (FIG. 11C) corresponds to a beam angle of a light beam that propagated from left to right in Layer 2, i.e. is out-coupled before reflection from the silver mirror corresponding to the reflector 121 in FIGS. 1A and 1B. FIGS. 11D and 11E illustrate the wavelength dependence of light detected by Detectors 1 and 2 respectively.

Figure 12A:
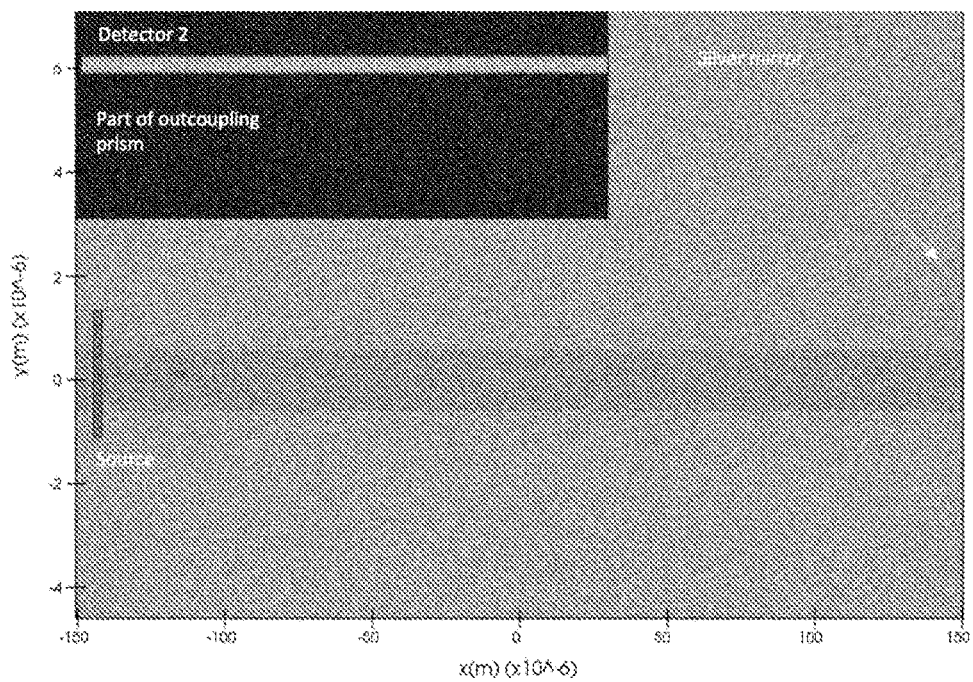
FIG. 12A is an example refractive index map of the waveguide of FIG. 5.

FIG. 12A illustrates a numerical simulation setup for the waveguide 500A of FIG. 5A. The source light is coupled into the first mode 511 of FIG. 5A. The light is converted into the second mode 512 upon reflection from a silver mirror (FIG. 12A). Detector 1 senses both the irradiance and direction of the collimated light beam. Detector 1 covers the entire few-mode waveguide. Detector 2 senses light out-coupled by an out-coupling prism.

Figure 12B:
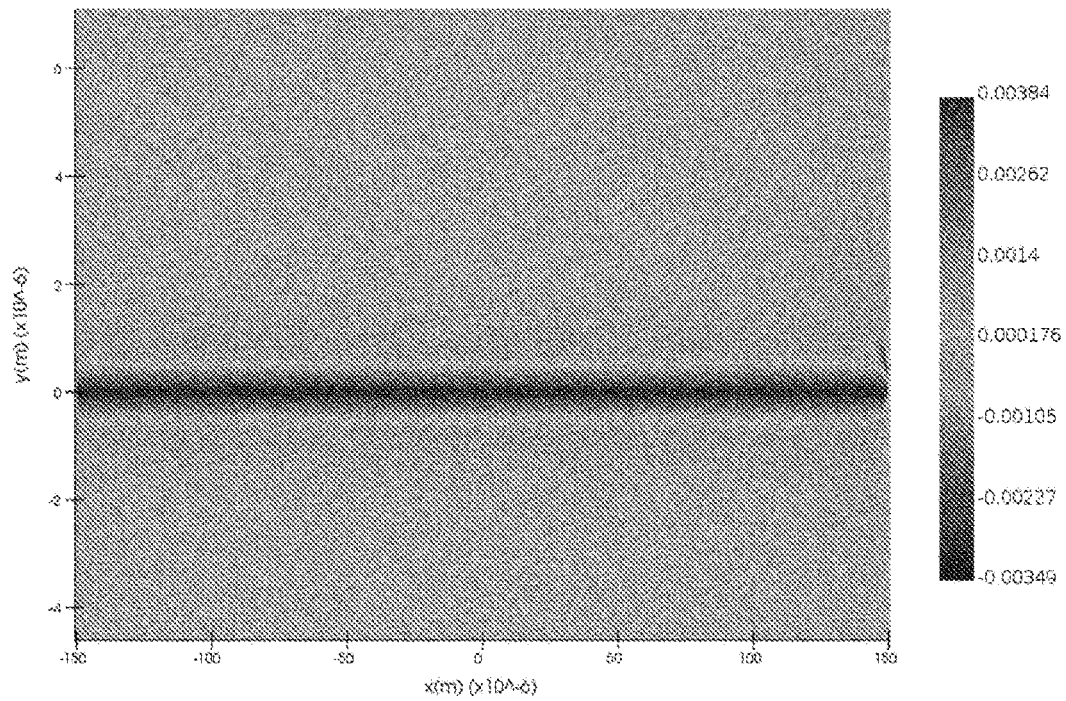
FIG. 12B is an irradiance map computed for the waveguide configuration of FIG. 12A.
Figure 12C:
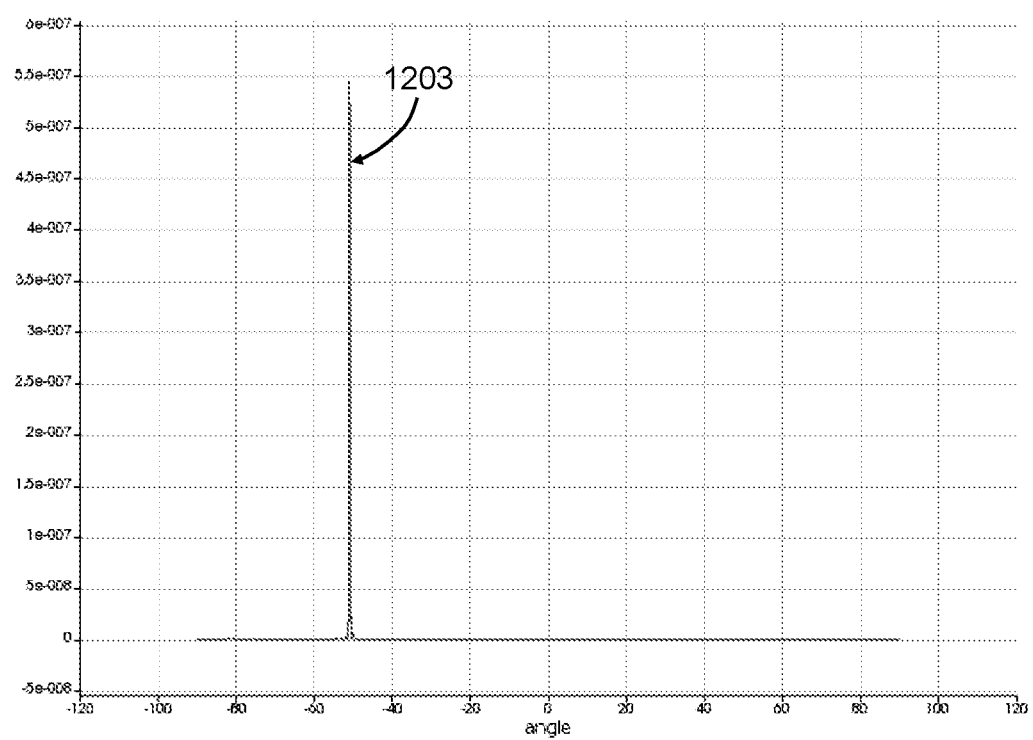
FIG. 12C is a far field angular irradiance distribution plot computed for the waveguide configuration of FIG. 12A.

FIG. 12B shows the results of the simulation for Detector 1. FIG. 12B is a heat map showing the irradiance at different locations of Detector 1 along the length dimension of the waveguide (left to right in FIGS. 12A and 12B). In FIG. 12, the forward light field is subtracted from the backward light field, so this plot appears as if the actual waveguide core is very narrow. FIG. 12C shows the signal on Detector 2 as a function of the beam angle. A main peak 1203 corresponds to a beam angle of a light beam propagated in the waveguide 500 of FIG. 5A from right to left in the second optical mode 212, i.e. according to the intended mode of operation. A peak corresponding to a beam angle of a light beam that propagated from left to right is too small to be seen in FIG. 12C.

Figure 13A:
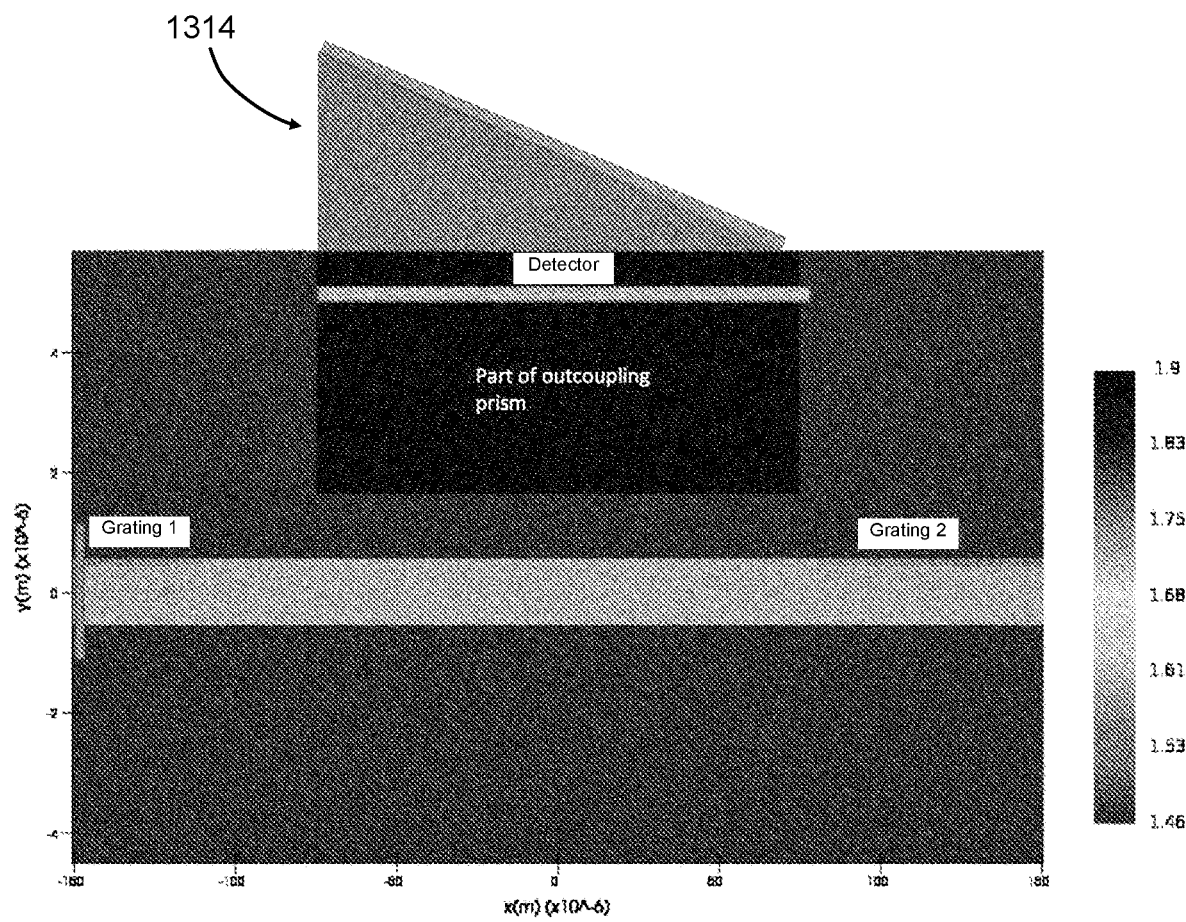
FIG. 13A is an example refractive index map of the waveguide of FIG. 5B.

FIG. 13A illustrates a numerical simulation setup for the waveguide 1000 of FIG. 10. The source light is coupled into the first mode 1011 shown in FIG. 10. The light is converted into the second mode 1012 upon reflection from Grating 1 (FIG. 13A), and from the second mode 1012 into the third lode 1013 upon reflection from Grating 2. The detector is disposed within the out-coupling region. An out-coupling prism 1314 is disposed in the out-coupling region. The detector senses the irradiance as a function of wavelength and the direction of the collimated light beam out-coupled by an out-coupling prism.

Figure 13B:
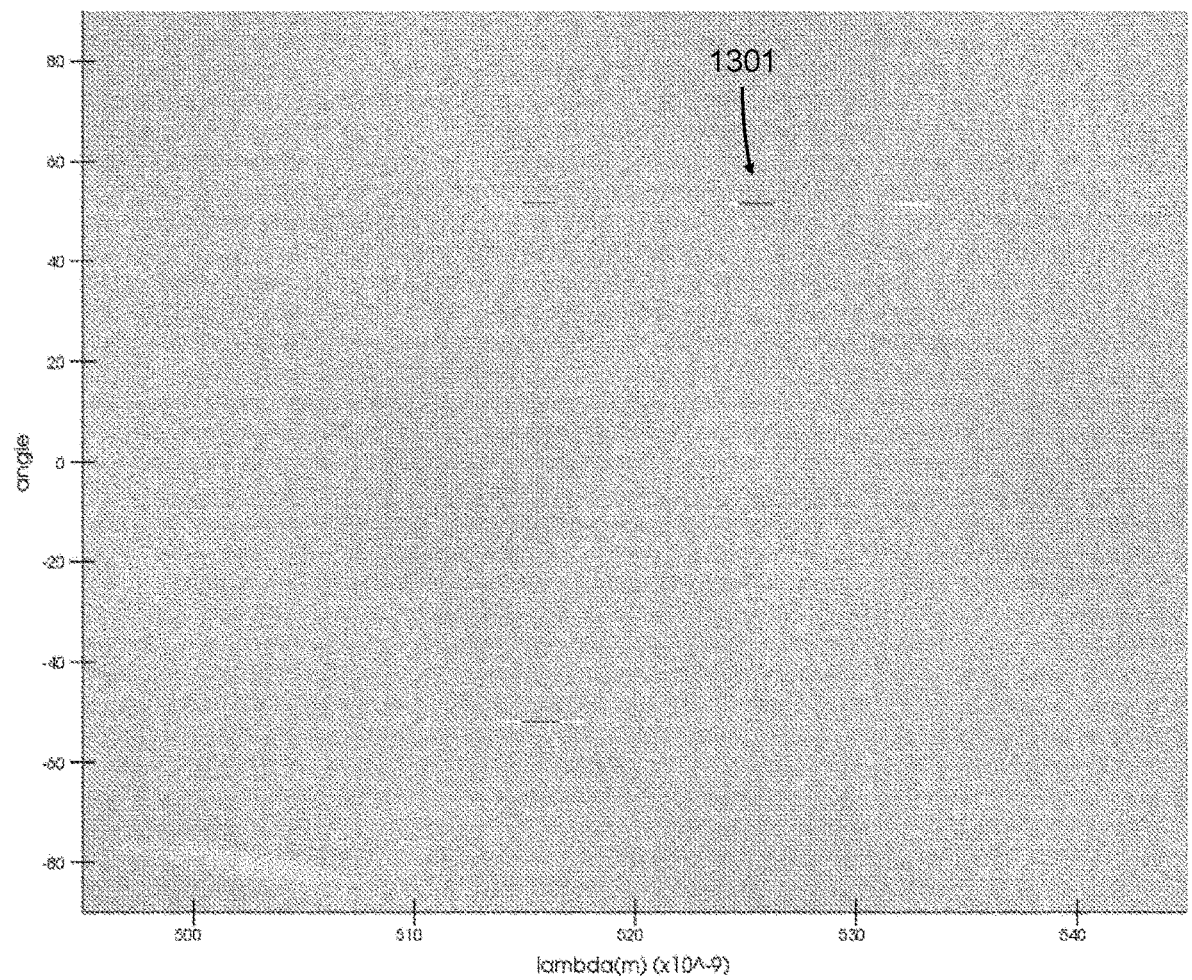
FIG. 13B is an irradiance map computed for the waveguide configuration of FIG. 13A.
Figure 13C:
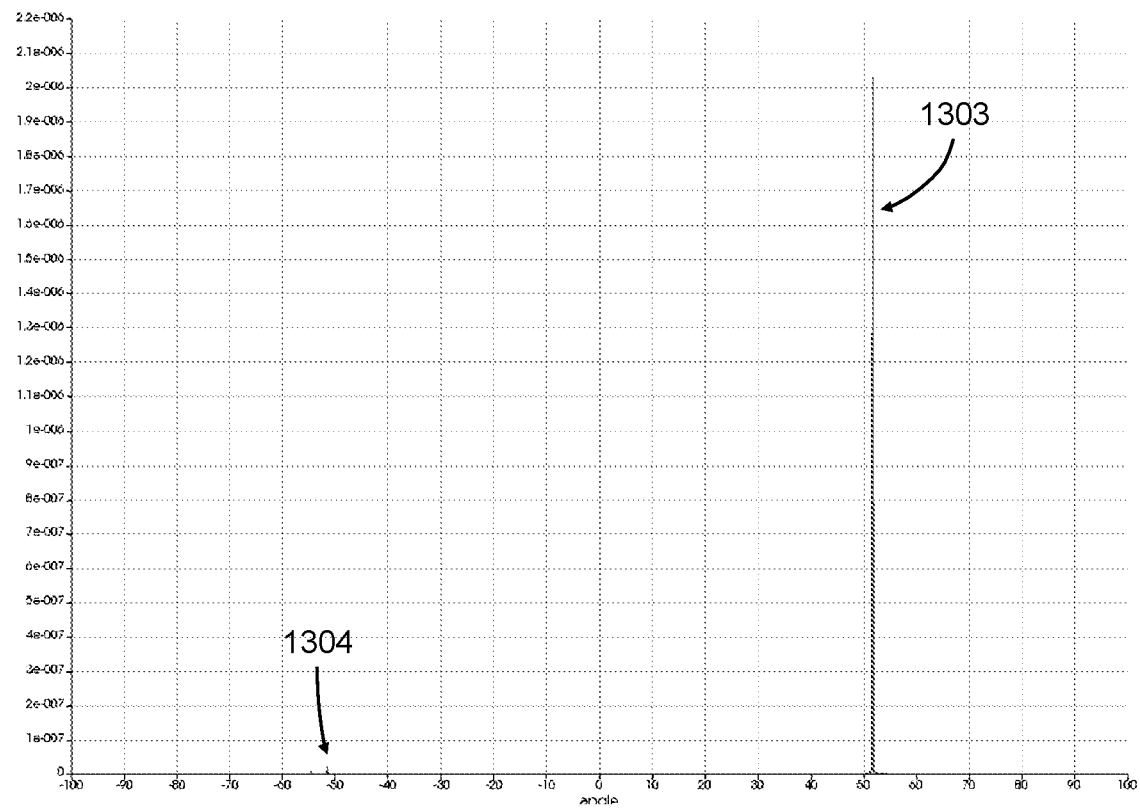
FIG. 13C is a far field angular irradiance distribution plot computed for the waveguide configuration of FIG. 13A.

FIG. 13B shows the results of simulation in form of a heat map showing the dependence of output irradiance on wavelength (horizontal axis) and output beam angle (vertical axis), i.e. the direction of output light. Primary output 1301 corresponds to the collimated output light beam. FIG. 13C shows the signal on Detector as a function of the beam angle. A main peak 1303 corresponds to a beam angle of a light beam propagated in the waveguide 500A of FIG. 5A back and forth after reflection from both diffractive reflectors 1021 and 1022 (FIG. 10). A secondary peak 1304 (FIG. 13C) corresponds to a beam angle of a light beam that is reflected from only the first diffractive reflector 1021.

Figure 14:
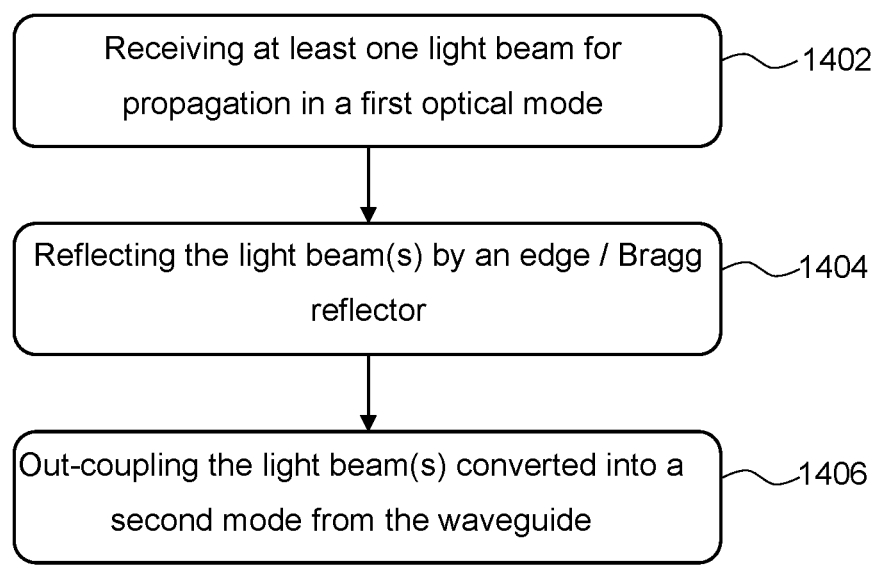
FIG. 14 is a flow chart of a method for collimating light in accordance with this disclosure.

Referring now to FIG. 14, a method 1400 for collimating light emitted by an array of light sources may be implemented using any of the waveguides or projectors considered herein. The method 1400 includes receiving (1402) light beams emitted by the array of light sources for propagation in a first optical mode of a slab core of a waveguide to an edge of the waveguide. The light beams are reflected (1404) by a reflector such as a curved mirror, or a curved diffractive reflector to propagate in the slab core structure back away from the edge. The light beams reflected by the reflector are out-coupled (1406) using, for example, an evanescent out-coupler or a grating-based out-coupler. The waveguide converts the light beams from the first optical mode to the second optical mode upon propagation in the slab core structure and reflection from the reflector. The curvature of the reflector may be selected so as to collimate the light beam upon out-coupling. More than one reflector may be provided. The reflectors may be coaxial to reduce optical aberrations and enable larger angles of collimated light beam. At least one light beam may be collimated in this manner. Tens, hundreds, or even thousands of light beams may be collimated with an appropriate multi-point light source array coupled to the waveguide.

Figure 15:
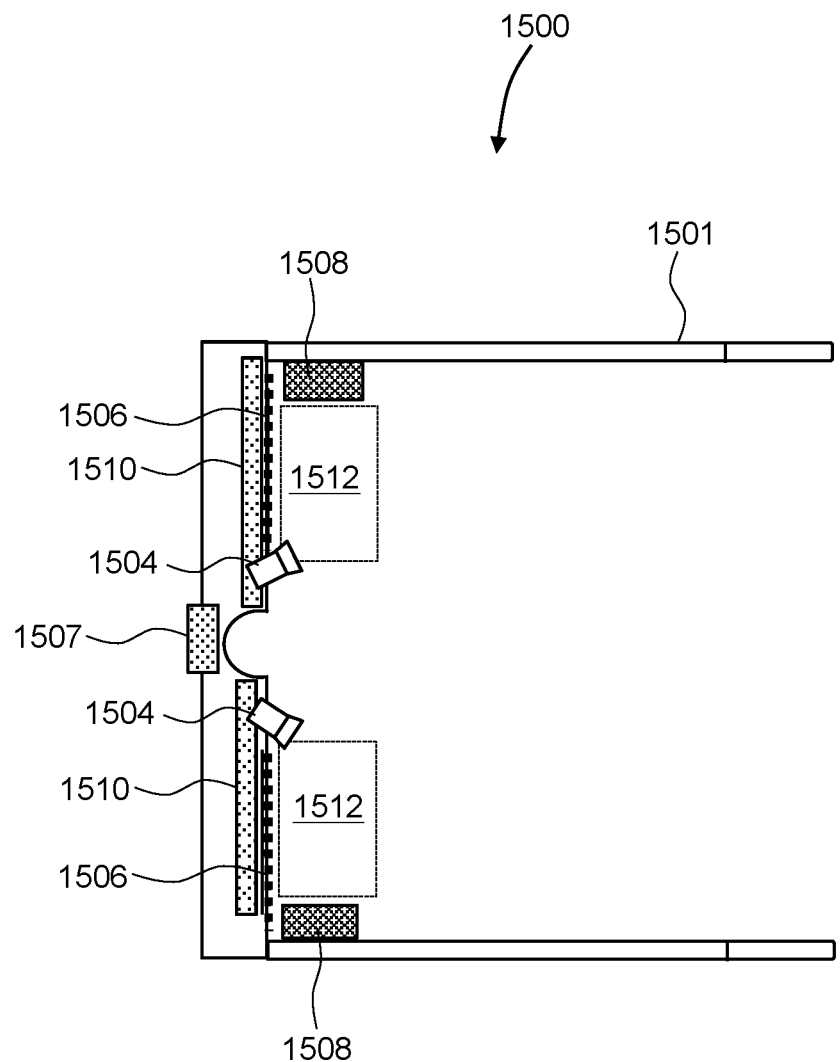
FIG. 15 is a view of a near-eye display of this disclosure having a form factor of a pair of eyeglasses.

Turning to FIG. 15, a near-eye display 1500 includes a frame 1501 having a form factor of a pair of eyeglasses. The frame 1501 supports, for each eye: a projector 1508 including any of the projectors described herein, a pupil-replicating waveguide 1510 optically coupled to the projector 1508, an eye-tracking camera 1504, a plurality of illuminators 1506, and an eye-tracking camera controller 1507. The illuminators 1506 may be supported by the pupil-replicating waveguide 1510 for illuminating an eyebox 1512. The projector 1508 provides a fan of light beams carrying an image in angular domain to be projected into a user's eye. The pupil-replicating waveguide 1510 receives the fan of light beams and provides multiple laterally offset parallel copies of each beam of the fan of light beams, thereby extending the projected image over the eyebox 1512.

Arrayed light sources may be used in the projector 1508 to provide the horizontal field of view, for example. A scanner based on a tiltable reflector, or a scanner based on wavelength tuning, may be used in the projector 1508 to provide the vertical field of view, or vice versa. For augmented reality (AR) applications, the pupil-replicating waveguide 1510 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1504 is to determine position and/or orientation of both eyes of the user. Once the position and orientation of the user's eyes are known, a gaze convergence distance and direction may be determined. The imagery displayed by the projectors 1508 may be adjusted dynamically to account for the user's gaze, for a better fidelity of immersion of the user into the displayed augmented reality scenery, and/or to provide specific functions of interaction with the augmented reality. In operation, the illuminators 1506 illuminate the eyes at the corresponding eyeboxes 1512, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1512.

The function of the eye-tracking camera controllers 1507 is to process images obtained by the eye-tracking cameras 1504 to determine, in real time, the eye gazing directions of both eyes of the user. In some embodiments, the image processing and eye position/orientation determination functions may be performed by a central controller, not shown, of the near-eye display 1500. The central controller may also provide control signals to the projectors 1508 to generate the images to be displayed to the user, depending on the determined eye positions, eye orientations, gaze directions, eyes vergence, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A near-eye display waveguide comprising:
a slab core structure supporting first and second optical modes of propagation;
an input port for receiving a light beam for propagation in the first optical mode;
a first reflector coupled to the slab core structure for reflecting the light beam to propagate back in the slab core structure; and
an out-coupling region for out-coupling the light beam reflected by the first reflector;
wherein the waveguide is configured for conversion of the light beam from the first optical mode to the second optical mode upon propagation in the slab core structure and upon reflection from the first reflector, whereby at least a portion of the light beam is out-coupled from the waveguide at the out-coupling region.

2. The near-eye display waveguide of claim 1, wherein the out-coupling region is configured for out-coupling light propagating in the second optical mode.

3. The near-eye display waveguide of claim 1, wherein the first reflector has optical power for at least partial collimation of the light beam received at the input port, wherein the collimation is in a plane of the slab core structure.

4. The near-eye display waveguide of claim 1, wherein the out-coupling region comprises an evanescent out-coupler.

5. The near-eye display waveguide of claim 1, wherein the slab core structure comprises parallel evanescently coupled first and second slab cores offset from one another in a direction of thickness of the waveguide by a distance at which a major portion of the light beam is converted from the first optical mode propagating in the first slab core to the second optical mode propagating in the second slab core when the light beam reflected from the first reflector reaches the out-coupling region.

6. The near-eye display waveguide of claim 1, wherein the slab core structure comprises parallel evanescently coupled first and second slab cores;
wherein the first slab core is a singlemode slab core, and the second slab core includes sequentially coupled first and second slab portions having different effective refractive indices, wherein the first portion is coupled to the first reflector, and the second slab portion is coupled to the out-coupling region; and
wherein the first and second slab cores are offset from one another in a direction of thickness of the waveguide by a distance at which a major portion of the light beam is converted from the first optical mode propagating in the first slab core to the second optical mode propagating in the first portion of the second slab core when the light beam reflected from the first reflector reaches the second portion of the second slab core.

7. The near-eye display waveguide of claim 1, wherein the slab core structure comprises parallel first and second slab cores;
wherein the first reflector comprises optically coupled first and second slanted reflectors, wherein the first slanted reflector is coupled to the first slab core for reflecting the light beam propagating in the first slab core to the second slanted reflector, and the second slanted reflector is coupled to the second slab core for coupling the light beam reflected by the second slanted reflector into the second slab core.

8. The near-eye display waveguide of claim 1, wherein the slab core structure comprises parallel first and second slab cores, wherein the first slab core comprises a first diffractive reflector proximate the first reflector, and the second slab core comprises a second diffractive reflector proximate the first reflector disposed over and optically coupled to the first diffractive reflector.

9. The near-eye display waveguide of claim 1, wherein the slab core structure comprises a few-mode waveguide, wherein the first mode is a zero-order mode of the few-mode waveguide, and the second mode is a higher-order mode of the few-mode waveguide;
wherein the first reflector comprises a step for providing a half-wave phase shift for a portion of light reflecting from the first reflector, whereby at least a portion of the light beam is converted from the zero-order mode to the higher-order mode upon reflection from the first reflector.

10. The near-eye display waveguide of claim 1, wherein the slab core structure comprises a few-mode waveguide, wherein the first mode is a zero-order mode of the few-mode waveguide, and the second mode is a higher-order mode of the few-mode waveguide;
wherein the first reflector comprises a diffractive reflector coupled to, or formed in the few-mode waveguide, and configured to convert at least a portion of the light beam from the zero-order mode to the higher-order mode upon reflection from the diffractive reflector.

11. The near-eye display waveguide of claim 10, wherein the diffractive reflector has a pitch
$P=\lambda(n^0_{eff}+n^1_{eff})$, where $\lambda$ is a wavelength of the light beam, $n^0_{eff}$ is an effective refractive index for the zero-order mode, and $n^1_{eff}$ is an effective refractive index for the higher order mode.

12. The near-eye display waveguide of claim 1, wherein:
the slab core structure further supports a third optical mode of propagation, the waveguide further comprising a second reflector coupled to the slab core structure for reflecting the light beam reflected by the first reflector to propagate back towards the first reflector;
the out-coupling region is configured for out-coupling light propagating in the third optical mode; and
the waveguide is configured for conversion of the light beam from the second optical mode to the third optical mode upon reflection from the second reflector and propagating in the slab waveguide structure, whereby at least a portion of the light beam is out-coupled from the waveguide at the out-coupling region.

13. The near-eye display waveguide of claim 12, wherein the first and second reflectors are coaxial curved reflectors having optical power for collimating the light beam received at the input port.

14. The near-eye display waveguide of claim 12, wherein the slab core structure comprises parallel evanescently coupled first, second, and third slab cores offset from one another in a direction of thickness of the waveguide by a distance at which a major portion of the light beam is converted from the first optical mode propagating in the first slab core to the second optical mode propagating in the second slab core when the light beam reflected from the first reflector reaches the second reflector; and from the second optical mode propagating in the second slab core to the third optical mode propagating in the third slab core when the light beam reflected from the second reflector reaches the out-coupling region.

15. The near-eye display waveguide of claim 12, wherein the slab core structure comprises a few-mode waveguide, wherein the first mode is a zero-order mode of the few-mode waveguide, and the second and third modes are higher-order modes of the few-mode waveguide;

wherein the first reflector comprises a first diffractive reflector coupled to, or formed in the few-mode waveguide, and configured to convert at least a portion of the light beam from the zero-order mode to the second mode upon reflection from the first diffractive reflector; and wherein the second reflector comprises a second diffractive reflector coupled to, or formed in the few-mode waveguide, and configured to convert at least a portion of the light beam from the second mode to the third mode upon reflection from the second diffractive reflector.

16. A near-eye display waveguide comprising:
a slab core structure supporting first and second optical modes of propagation, the slab core structure comprising an intermodal coupler for conversion of a light beam from the first optical mode to the second optical mode upon propagation in the intermodal coupler;
an input port upstream of the intermodal coupler for receiving the light beam for propagation in the slab core structure in the first optical mode; and
an out-coupling region downstream of the intermodal coupler for out-coupling light propagating in the second optical mode.

17. The near-eye display waveguide of claim 16, wherein the intermodal coupler has at least one of: optical power for collimation or defocusing the light beam; or an aberration correction capability.

18. The near-eye display waveguide of claim 16, wherein:
the first and second optical modes have different effective refractive indices; and
the intermodal coupler comprises a grating shaped in a plane of the slab core structure for different rays of the light beam in the plane of the slab core structure to have different optical path length from the input port to the grating.

19. A near-eye display projector comprising:
an array of light sources for providing light beams; and
a waveguide comprising:
a slab core structure supporting first and second optical modes of propagation;
an input port for receiving the light beams from the array of light sources for propagation in the first optical mode;
a reflector coupled to the slab core structure for reflecting the light beams to propagate back in the slab core structure; and
an out-coupling region for out-coupling the light beams reflected by the reflector from the waveguide;
wherein the waveguide is configured for conversion of the light beams from the first optical mode to the second optical mode upon propagation in the slab core structure and reflection from the reflector, whereby at least a portion of the light beams is out-coupled from the waveguide at the out-coupling region.

20. The near-eye display projector of claim 19, wherein the reflector has optical power for collimating the light beams received at the input port, and wherein the out-coupling region comprises an evanescent out-coupler configured for out-coupling light propagating in the second optical mode.

* * * * *